US006729956B2

(12) United States Patent
Wolf et al.

(10) Patent No.: US 6,729,956 B2
(45) Date of Patent: May 4, 2004

(54) GAMING APPARATUS WITH PLAYER TRACKING CAPABILITIES

(75) Inventors: Bryan Wolf, Reno, NV (US); Craig A. Paulsen, Reno, NV (US)

(73) Assignee: IGT, Reno, NV (US)

( * ) Notice: Subject to any disclaimer, the term of this patent is extended or adjusted under 35 U.S.C. 154(b) by 17 days.

(21) Appl. No.: 10/053,977

(22) Filed: Jan. 18, 2002

(65) Prior Publication Data

US 2003/0139214 A1 Jul. 24, 2003

(51) Int. Cl.[7] ................................................ A63F 13/00
(52) U.S. Cl. ......................... 463/25; 463/16; 273/138.2
(58) Field of Search ......................... 463/16–22, 12–13, 463/25; 273/138.1, 138.2, 139, 143 R

(56) References Cited

U.S. PATENT DOCUMENTS 5,851,148 A 12/1998 Brune et al.
6,150,921 A 11/2000 Werb et al.
6,155,925 A 12/2000 Giobbi et al.
6,210,279 B1 4/2001 Dickinson
6,293,866 B1 9/2001 Walker et al.
6,309,300 B1 10/2001 Glavich
6,315,664 B1 11/2001 Baerlocher et al.
6,319,124 B1 11/2001 Baerlocher et al.
6,319,125 B1 * 11/2001 Acres .......................... 463/25
6,361,437 B1 * 3/2002 Walker et al. ................ 463/23

* cited by examiner

*Primary Examiner*—Jessica Harrison
*Assistant Examiner*—Aaron Capron
(74) *Attorney, Agent, or Firm*—Marshall, Gerstein & Borun LLP

(57) ABSTRACT

A gaming apparatus may comprise a display apparatus capable of generating video images, a value input device capable of allowing the player to deposit a medium of value, and a controller operatively coupled to the display apparatus and value input device. The controller includes a processor and a memory operatively coupled to the processor, where the controller is programmed to monitor actions by a player during use of the gaming apparatus, determine a potential game parameter based on monitored actions, and operate the gaming apparatus and display images on the display apparatus responsive to the determined potential game parameter. The potential game parameters may include likely current wager values for the player, player game selection preferences, and selection of pay tables for the player. Further, the gaming apparatus monitors a plurality of sets of monitored actions by a player, and determine a plurality of potential game parameters, each game parameter based on one of the plurality of sets of monitored actions, where the controller operates the gaming apparatus and displays images on the display apparatus responsive to the determined plurality of potential game parameters.

45 Claims, 21 Drawing Sheets

| | PRIVILEGE LEVEL REQUIREMENTS | CONFIGURATION | |
|---|---|---|---|
| 730 | USING THE PLAYER TRACKING FEATURE | ENABLED | 731 |
| 732 | CONTINUOUS PLAY | ENABLED, DURATION = 45 MINUTES | 733 |
| 734 | WAGER | ENABLED, REQUIRED BET OF 5 CREDITS | 735 |
| 736 | AMOUNT PLAYED | ENABLED, REQUIRES 500 CREDITS PLAYED, NO TIME LIMIT SET | 737 |

| | PRIVILEGE LEVEL | PAYTABLE | |
|---|---|---|---|
| 740 | 0 | PAYTABLE A (80%) | 741 |
| 742 | 1 | PAYTABLE B (82%) | 743 |
| 744 | 2 | PAYTABLE C (84%) | 745 |
| 746 | 3 | PAYTABLE D (86%) | 747 |
| 748 | 4 | PAYTABLE E (88%) | 749 |
| 750 | 5 | PAYTABLE F (90%) | 751 |

GAMING APPARATUS WITH PLAYER TRACKING CAPABILITIES

BACKGROUND OF THE INVENTION

This invention relates to a gaming apparatus, and more specifically, to a gaming apparatus capable of tracking player actions.

A gaming apparatus, for example as maybe located in a casino, allows a customer of the casino to play one or more games, such as poker, blackjack, slots, keno, and bingo. A customer typically approaches a gaming apparatus, and selects a desired game from the games offered on the gaming apparatus. Upon selection of the desired game, that game appears on the gaming apparatus, at which time the customer is allowed to play.

During play, the customer places a wager, and proceeds with the selected game. For example, where the customer is playing slots, a lever may be pulled to spin the reels. The reels then stop on various symbols, which determines the customer's payout for that spin, after which the customer may place another wager and proceed as discussed above. Where the customer has selected to play blackjack or poker, the player may hit a "deal card" button to deal out the cards for the respective card game. The customer may alter his wager during the particular hand based on which cards are dealt, and in some card games, replace cards, or continue to request cards. After all replacements and/or requests are made, a payout is determined, and the player may continue by placing another wager and playing a new hand.

Playing the games requires many actions (motions) on the part of a customer, most of which are repetitive motions. It takes a customer time to proceed with their motions, whether they be motions for game selection at the beginning of a gamming session, or placing/changing wager amounts. To alleviate repetitive motions, some gaming apparatuses automatically set the wager amount to the previous amount wager. However, the previous wager amount is not always desired by customers, as various game circumstances may be considered in placing a wager, such as payout amount, amount of credits remaining in the gaming apparatus, whether the customer is experiencing a winning or losing streak, etc.

SUMMARY OF THE INVENTION

In accordance with the invention, a gaming apparatus is provided including a display apparatus that is capable of generating video images, a value input device that is capable of allowing the player to deposit a medium of value, and a controller operatively coupled to the display apparatus and the value input device. The controller includes a processor and a memory operatively coupled to the processor, where the controller is programmed to allow the player to make a wager, and the controller is programmed to cause a sequence of video images to be generated on the display apparatus after the value input device detects deposit of value by the player where the sequence of video images represents the game. The controller is further programmed to monitor actions by a player during use of the gaming apparatus, where the controller is programmed to determine a potential game parameter based on the monitored actions, and operate the gaming apparatus and display images on the display apparatus responsive to the determined potential game parameter.

In one embodiment, the controller is programmed to monitor the player's previous wagers, and determine the likely current wager value for the player as the potential game parameter, where the controller is programmed to display the likely current wager value on the display apparatus. In another embodiment, the controller is programmed to monitor the player's previous game selections and determine the likely current game selection for the player as the potential game parameter. Here, the controller is programmed to display video images corresponding to a likely current game selection for the player on the display apparatus. In yet another embodiment, the controller is programmed to monitor the player's privilege level actions, and to determine the player privilege level from the monitored privilege level actions as the potential game parameter, where the controller is programmed to display the pay table for the player corresponding to the player privilege level on the display apparatus.

In another embodiment, the controller is further programmed to generate an explanation message and to display the explanation message on the display apparatus, where the explanation message provides an explanation to the player for the operation of the gaming apparatus and the displaying of information on the display apparatus responsive to the potential game parameter.

In another embodiment, the determined potential game parameter represents a likely action for the player based on the plurality of monitored player actions.

In yet another embodiment, the controller is programmed to determine the likelihood factor that the potential game parameter is a desired action for the player, where the controller is programmed to operate the gaming apparatus and to display information on the display apparatus responsive to the determined likelihood factor. In a further embodiment, the controller is programmed to provide threshold likelihood factor functionality, where the controller is programmed to operate the gaming apparatus and to display information on the display apparatus responsive to the determined likelihood factor exceeding a predetermined threshold.

In another embodiment, the controller is programmed to monitor a plurality of sets of player actions, where the controller determines a plurality of potential game parameters, each of the potential game parameters being based on one of the sets of monitored actions. The controller is programmed to operate the gaming apparatus and display information on the display apparatus responsive to the plurality of determined potential game parameters. In a further embodiment, the controller is programmed to determine a plurality of likelihood factors, where each likelihood factor corresponds to one of the plurality of potential game parameters and represents a likelihood that the corresponding potential game parameter is the desired action for the player. The controller is further programmed to select the potential game parameter having the highest likelihood factor, where the controller is programmed to operate the gaming apparatus and to display information on the display apparatus responsive to the selected potential game parameter. In a further embodiment yet, the controller is programmed to resolve conflicts between selected potential game parameters having an equal likelihood factor of being the desired action for the player. Such conflict resolution may occur based on a priority corresponding to each potential game parameter, wherein the potential game parameters having both the highest likelihood factor and the highest priority is selected by the controller when there are more than one potential game parameter having the highest likelihood factor.

The features and advantages of the present invention will be apparent to those of ordinary skill in the art in view of the detailed description of various embodiments, which is made with reference to the drawings, a brief description of which is provided below.

DETAILED DESCRIPTION OF VARIOUS EMBODIMENTS

Figure 1:
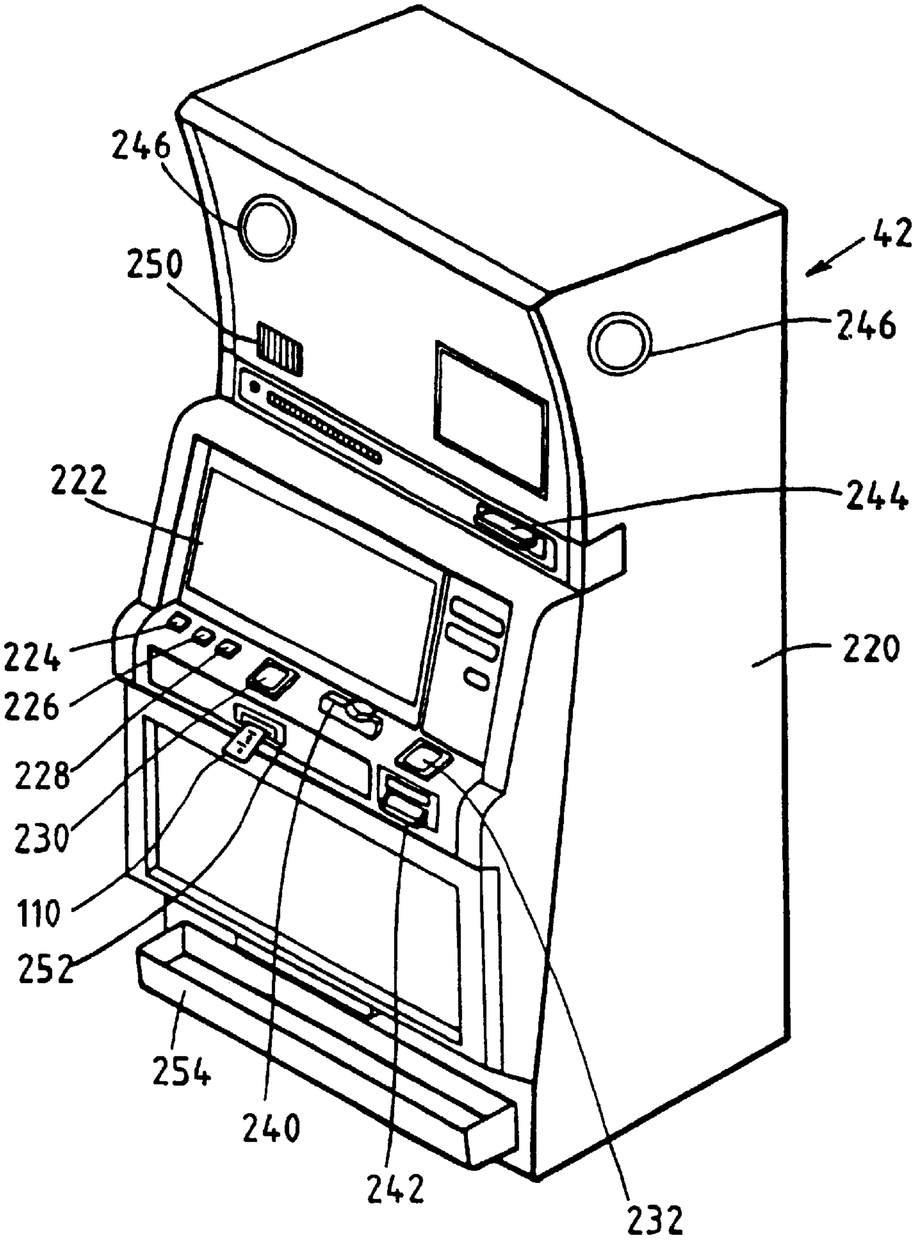
FIG. 1 is a perspective view of an embodiment of a gaming apparatus in accordance with the present invention.

A gaming apparatus 42 incorporating the teachings of the present invention including performing player tracking is schematically illustrated at FIG. 1. The gaming apparatus 42 may be any type of gaming apparatus and may have various different structures and methods of operation. For exemplary purposes, a particular type of gaming apparatus 42 is described below, but it should be understood that numerous other types may be provided.

Referring to FIG. 1, the gaming apparatus 42 may include a cabinet 220 having a display apparatus 222 for observing game progress on the gaming apparatus 42. The gaming apparatus 42 may also include a variety of input devices, such as touch-sensitive devices or buttons 224, 226, 228 and 230 that a customer may actuate to make or alter wagers and game-specific selections such as hold or discard decisions, a slots spin button 232, and/or any other type of input device. Additional inputs may be provided in the form of a touch-screen (not shown).

The gaming apparatus 42 may include a variety of currency- or value-accepting mechanisms that maybe disposed on the front of the gaming apparatus 42 or in any other suitable location. The value-accepting mechanisms may include any device that can accept value from a customer. As used herein, the term "value" may encompass gaming tokens, coins, paper currency, ticket vouchers, and any other suitable object representative of value. For example, the value-accepting mechanisms may include a coin acceptor 240 that accepts coins or tokens; a bill acceptor 242 that accepts and validates paper currency; a card or ticket reader 244 that accepts coupons, credit cards, printed cards, smart cards, ticket vouchers, etc.; and any other device that may accept a medium of value. In addition, the card or ticket reader 244 may accept a player tracking card. Further, a player may hold an account with a casino(s), where a player identification number for the account is keyed into the gaming apparatus using a keypad (not shown). The tracking card and player account may correspond to information such as a value (for example, a number of credits) available to a player for use on the gaming apparatus 42, and may be used to maintain the player tracking parameter information of the invention.

The gaming apparatus 42 may include additional features to enhance a player's game-playing experience, such as one or more audio speakers 246, a sound-generating circuit 248 (FIG. 2), and an aroma dispenser 250. The audio speakers 246 may provide various forms of sound relevant to the casino game that the player is playing. For example, the speakers 246 may generate audio representing sounds such as the noise of spinning slot machine reels, a dealer's voice, music, announcements or any other suitable audio related to a casino game. The aroma dispenser 250, which may be mounted above the viewing area 222 or in any other suitable location on the gaming apparatus 42, may be manufactured by MicroScent, DigiScents, or Aromajet.

The gaming apparatus 42 may also include a printer 252 disposed on the front of the gaming apparatus 42 or in any other suitable location. The printer 252 may be used, for example, to print the ticket vouchers for use by a player at a later time. The gaming apparatus 42 may also include a payout tray 254 of the type provided on slot machines, for example.

Gaming Apparatus Electronics

Figure 2:
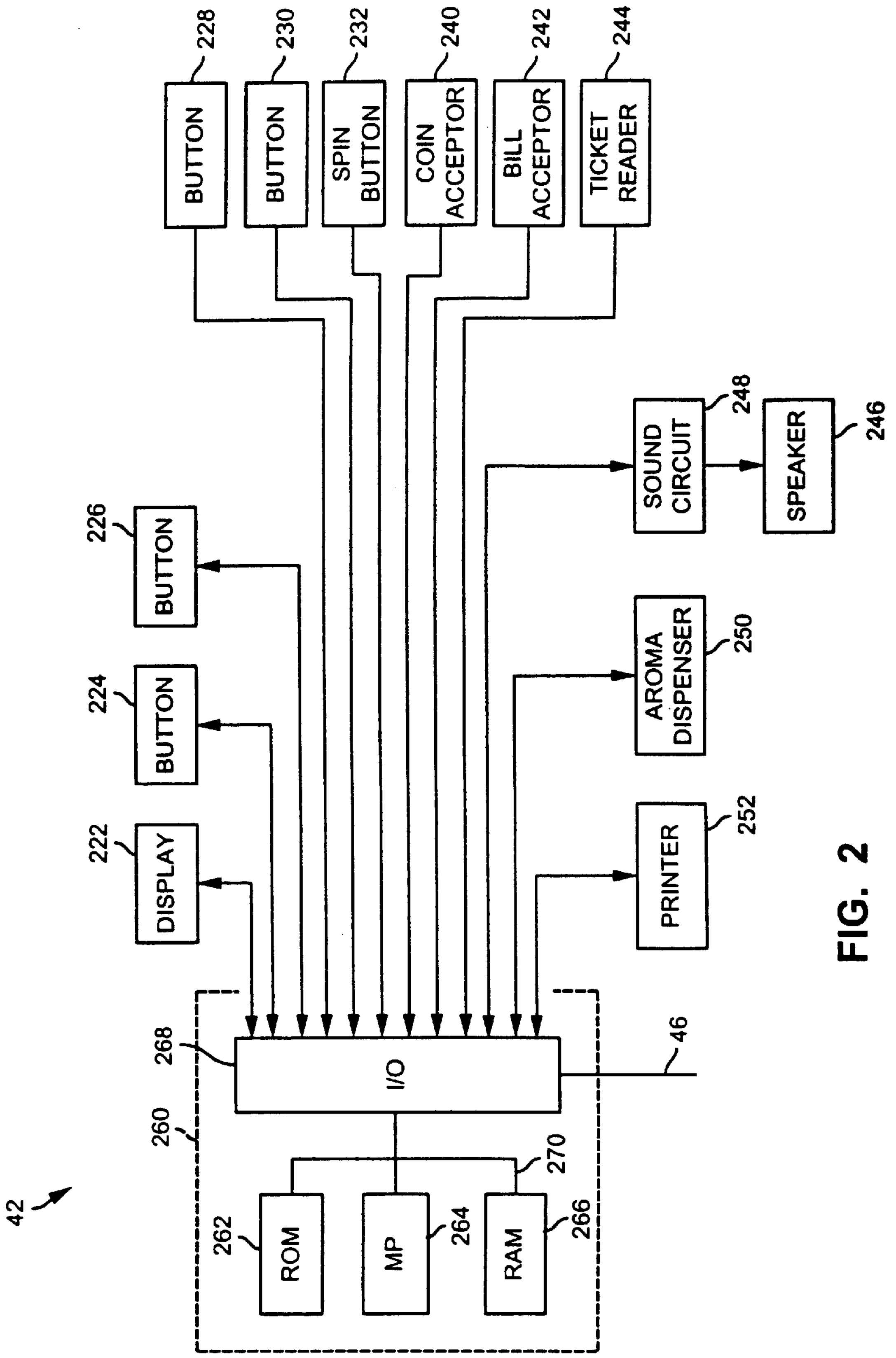
FIG. 2 is a block diagram of the electronic components of the gaming apparatus of FIG. 1.

FIG. 2 is a block diagram of a number of components that may be incorporated into the gaming apparatus 42. Referring to FIG. 2 the gaming apparatus 42 may include a gaming apparatus controller 260 that may comprise a read-only memory (ROM) 262, a microcontroller or microprocessor (MP) 264, a random-access memory (RAM) 266 and an input/output (I/O) circuit 268, all of which maybe interconnected via an address/data bus 270. It should be appreciated that although only one microprocessor 264 is shown, the controller 260 could include multiple microprocessors 264. Similarly, the memory of the controller 260 could include multiple RAMs 266 and multiple ROMs 262. Although the I/O circuit 268 is shown as a single block, it should be appreciated that the I/O circuit 268 could include a number of different types of I/O circuits. The RAM(s) 266 and ROM(s) 262 could be implemented as semiconductor memories, magnetically readable memories, and/or optically readable memories, for example. The controller 260 may be operatively coupled to each of the components shown in FIG. 2.

FIG. 2 also illustrates that the components shown in FIG. 1 could be connected to the I/O circuit 268 via a respective direct line or conductor. Different connection schemes could be used. For example, one or more of the components shown in FIG. 2 could be connected to the I/O circuit 268 via a common bus or other data link that is shared by a number of components. Furthermore, some of the components could be directly connected to the microprocessor 264 without passing through the I/O circuit 268.

Overall Operation of Gaming Apparatus

One manner in which the gaming apparatus 42 may operate is described below in connection with a number of flowcharts which represent a number of portions or routines of one or more computer programs including routines for implementing player tracking, which may be stored in one or more of the memories of the controller 260. The computer program(s) or portions thereof may be stored remotely, outside of the gaming apparatus 42, and may control the operation of the gaming apparatus 42 from a remote location. Such remote control may be facilitated with the use of a wireless connection, or by an Internet interface (not shown) that connects the gaming apparatus 42 with a remote computer (not shown) having a memory in which the computer program portions are stored via the Internet. The computer program portions may be written in any high level language such as C, C++ or the like or any low-level, assembly or machine language. By storing the computer program portions therein, various portions of the memories 262, 266 are physically configured, either magnetically (e.g., in the case of a magnetic memory), electrically (e.g., in the case of a semiconductor memory) or structurally (e.g., in the case of an optical memory), in accordance with computer program instructions.

Figure 3:
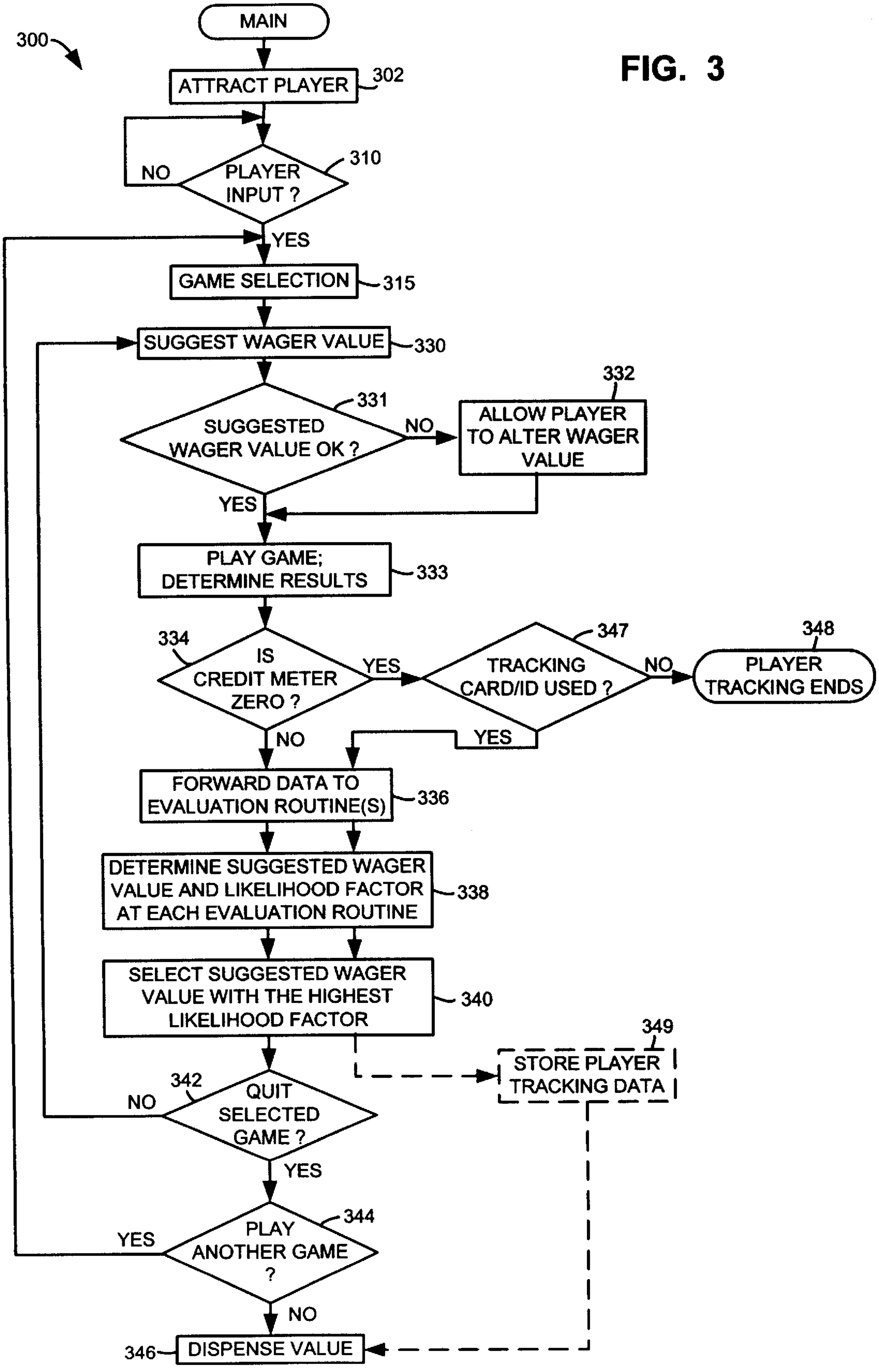
FIG. 3 is a flowchart of a main routine that may be performed by the controller shown in FIG. 2.

FIG. 3 is a flowchart of a main, or controlling, operating routine 300 that may be stored in the memory of the controller 260 and used for operation of the gaming apparatus 42, including implementation of the player tracking in accordance with the invention. Referring to FIG. 3, the main routine 300 may begin execution at block 302 at which time player attraction graphics may be displayed on the display 222 (FIGS. 1 and 2). Player attraction graphics may include a scrolling list of casino games that may be played on the gaming apparatus 42, cartoons, videos, etc. While the graphics are being displayed in the attraction mode, the controller 260 may intermittently check for player input indicating initiation of a gaming session, shown at block 310. Such input may include insertion of a player tracking card, entry of an identification number, or by polling of the value accepting devices 240, 242, 244 or one of the input devices 224, 226. Upon detection of the player input, and thus the beginning of the gaming session in box 310, a game is selected, as shown in box 315. The game selected may be one of poker, blackjack, slots, keno, and bingo, or any other game offered by the gaming apparatus 42. The game selection may be accomplished using player tracking to provide a suggested game selection (defining by way of example a potential game parameter) which may be determined by the controller 260 based on monitored player actions, here previous game selections. The information regarding previous game selections for the player may be retrieved using the player tracking card or player identification. Game selection is discussed in greater detail with respect to FIG. 11.

After the game selection has occurred at box 315, the player places a wager and plays the selected game at box 330. At box 330, the player may place a wager amount suggested by the controller 260 (defining by way of example a potential game parameter) which may be determined by the controller 260 based on monitored player actions, here previous wagers made by the player. Information used in determining a suggested wager value for the player may be stored on a player tracking card, or in a central data base corresponding to a player tracking card or player identification. When a player is not using a player tracking card or player identification, such information for a current gaming session may be stored locally in a memory of the gaming apparatus 42, or in a central data base referenced to the gaming apparatus 42 on which the player is playing. Player tracking for providing a suggested wager amount is further discussed below with respect to FIGS. 4–10. The controller 260 may, for example, suggest a wager amount based on an average wager placed by the player, the last 'N' wagers placed by the player, the player's wager on winning and losing streaks, the players wager on a big win, the player's wager based on money in the machine, and the player's wager made when the player is running out of money.

At box 331, it is determined whether the suggested wager value is OK. Where the suggested wager value is OK, the game is played and the results are determined for the game at box 333. Specifically, it may be determined whether a player has won or lost, and where the player has won, a payout amount. Here, player tracking may be used in determining a payout table for the player (defining by way of example a potential game parameter), based on monitored players actions, here pay table requirements such as the number of credits played by the player, the amount of time the player has been playing, etc. Where the player meets one or more of the pay table requirements, a different pay table may be selected offering increased payouts for the player. Information regarding pay table requirements may be stored on a player tracking card, or in a central data base corresponding to a player tracking card or player identification. Further, where a player is not utilizing a player tracking card or player identification, the information may be stored locally in a memory for the gaming apparatus 42, or in a central data base referencing the gaming apparatus 42.

Where the suggested wager value is not OK for the player at box 331, the player is allowed to alter the wager value to a desired amount, as shown at box 332. The routine then continues to box 333 as described above. At box 334, it maybe determined whether the player credit meter, that is the number of credits left for the player to use, is zero. Where the credit meter is not zero at box 334, the main, or controlling routine 300 forwards data to evaluation routine (s) at box 336, which provide the suggested wager amount(s) discussed with respect to box 330. The data forwarded to the evaluation routine(s) may include wager amount, credit meter at the start of the game, and the value/money won during the previous game. Additional or alternate data may be forwarded to the evaluation routine(s) for determining the suggested wager amount. Each evaluation routine performs calculations and returns a suggested wager amount and a likelihood factor for the suggested wager amount at box 338, and the controlling routine selects the suggested wager amount from the evaluation routines having the highest likelihood factor at box 340.

The player may be given the option to quit the selected game at box 342. Where the player does not desire to quit the game, the controlling routine 300 returns to box 330 as discussed above. However, where the player desires to quit the selected game at box 342, the player may be given the choice to play a different game at box 344. Where the player wishes to play a different game, the controlling routine 300 returns to box 315 and proceeds as discussed above. However, where the player does not desire to play a different game at box 344, the value is dispensed at box 346. This dispensing of value may be accomplished by providing the value remaining in the gaming apparatus 42 at the dispensing tray 254, or alternatively by recording the players value on the player tracking card or to the particular player tracking identification.

Where the credit meter is zero at box 334, the controller 260 determines whether the player is using a player tracking card or player identification at box 347. Where the player is not using a player tracking card or player identification, the player tracking ends, box 348. However, where the player is using a player tracking card at box 347, the main routine 300 continues to box 336 through box 340 as discussed above and indicated by dashed lines, and the routine proceeds to box 349 where likelihood factors, suggested wager values, and/or other player tracking data may be stored on the player tracking card, or in a central data base corresponding with the player tracking card or player identification number, to be used for future gaming sessions. The routine then proceeds to box 346 where value is dispensed, as discussed above. FIGS. 4–11 discuss general and specific embodiments for the evaluation routines for implementing player tracking in providing suggested wager amounts to the player.

General Evaluation Routine

Figure 4:
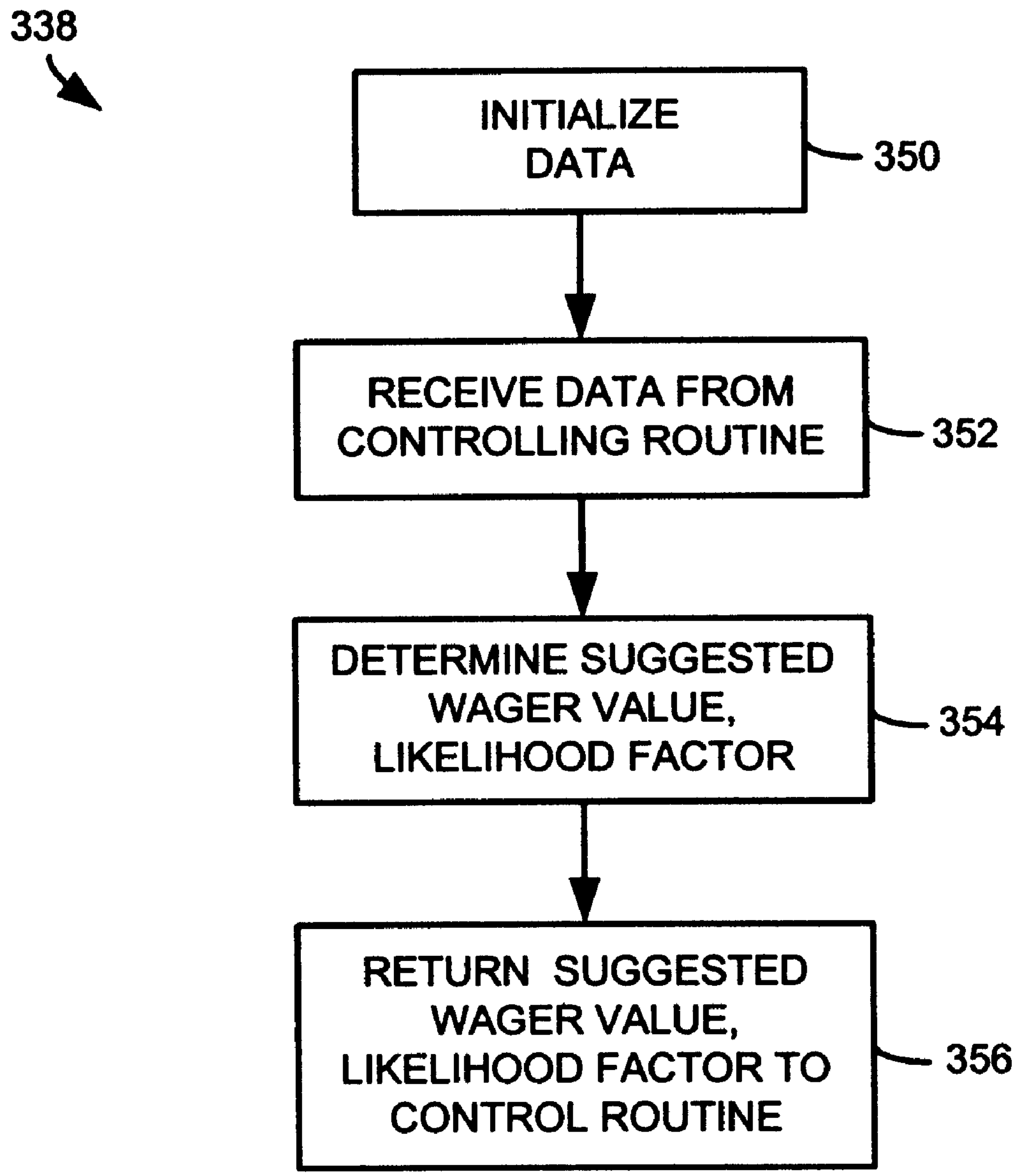
FIG. 4 illustrates a general player tracking routine in accordance with an embodiment of the invention.

FIG. 4 illustrates a general player tracking routine 338 which may be implemented on the controller 260 of FIG. 2, in accordance with an embodiment of the invention. At box 350, data may be initialized to predetermined values. This box may be performed where the evaluation routine is run with new data. For example, the data may be initialized when a player uses a player tracking card or keys in a player identification for the first time, and when a player begins a gaming session without use of a player tracking card or player tracking identification. At box 352, data is received from the controlling routine 300. Such data may include but is not limited to a win/loss status of the last game played, a win amount of the last game, a last wager amount of the last game, and a last credit meter amount for the player. The data from the controlling routine may be used by the controller 260 to update internal data and to make a determination of the potential game parameter, for example a suggested wager amount and to determine a likelihood factor, which are returned to the controlling routine 300, shown at box 354. A suggested wager amount and likelihood factor may be returned to the controlling routine 300 at box 356.

The evaluation routine may be run as a program or routine on the controller 260, when the controlling routine 300 (FIG. 3) reaches box 338. As discussed, the data initialization shown in box 350 need only occur when a player uses a player tracking card or player tracking identification for the first time, or when a player starts a gaming session without a player tracking card or player tracking identification. Subsequent calls to the evaluation routine from box 338 thus begin at box 352, proceed through box 356, at which time a suggested wager amount and likelihood factor is returned to box 340 of the controlling routine 300. Specific evaluation routines are illustrated in the flow charts of FIGS. 5–11 for implementing player tracking in providing suggested wager amounts to the player.

Specific Evaluation Routines

Figure 5:
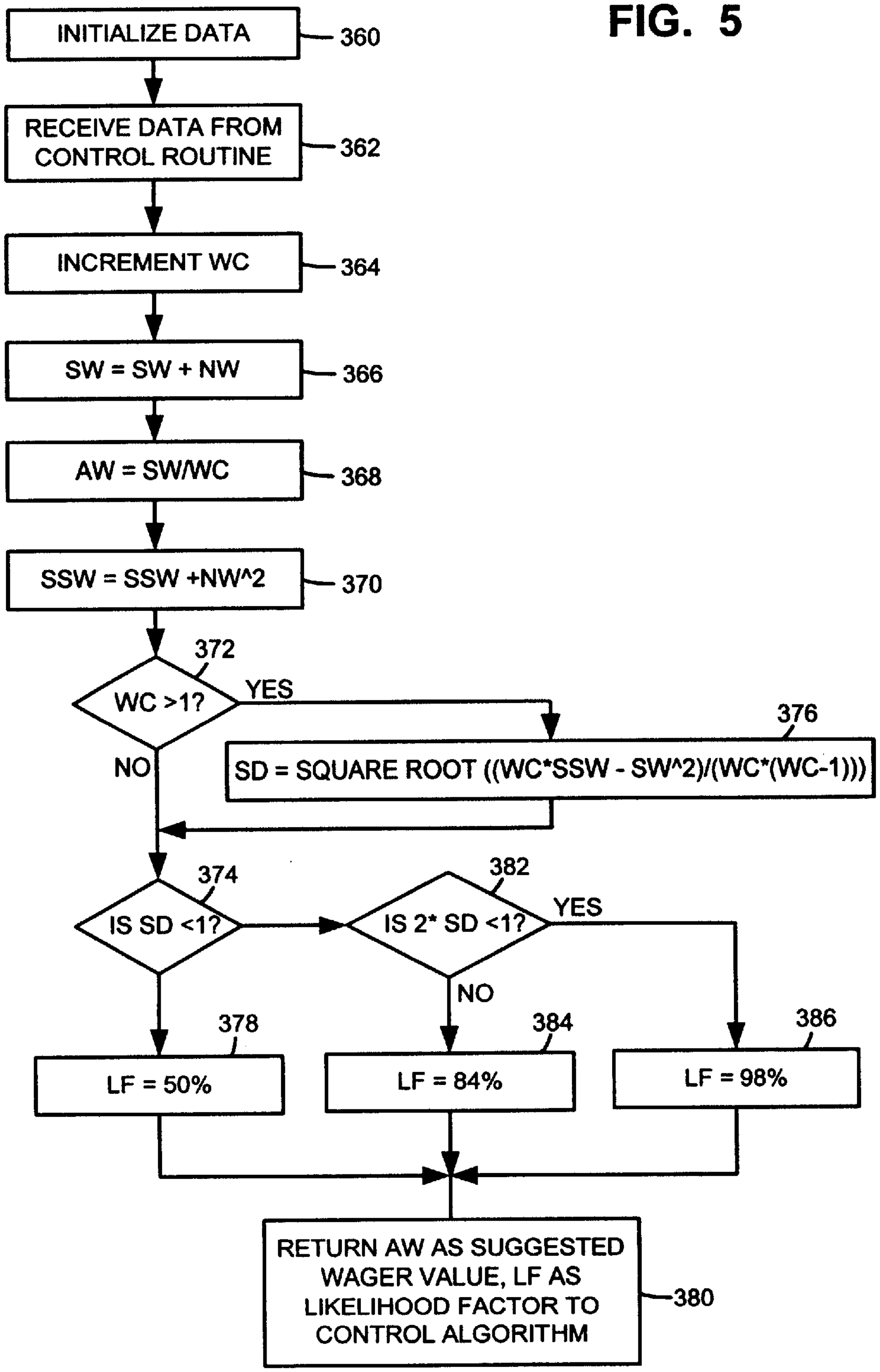
FIG. 5 illustrates a specific evaluation routine based on a player's average wager that may be performed by the controller of FIG. 2 in accordance with an embodiment of the invention.

FIG. 5 is a flow chart illustrating a specific evaluation routine 338A implementable on the controller 260, based on a player's average wager in accordance with an embodiment of the invention. At box 360, data may be initialized to zero including a player's wager count, sum of wagers, average wager, sum of squares of wagers, standard deviation, and likelihood factor. As discussed above with respect to FIG. 4, this data is initialized the first time the evaluation routine is run such as when a player uses player tracking card or player tracking identification for the first time, or when a player starts a gaming session without using a player tracking card or player tracking identification. Subsequent calls to this routine will begin at box 362.

Data, including a new wager amount, may be received at box 362 from the controlling routine 300, and a wager count may be incremented at box 364. The controller 260 then adds the new wager amount to a sum of wagers value to form a new sum of wagers value, box 366, and calculates an average wager amount by dividing the sum of wagers value by the wager count and rounding down to the nearest integer at box 368. The new wager amount is then squared and added to the sum of squares of wagers value to form a new sum of squares of wagers value at box 370, and it may be determined by the controller 260 whether the wager count is greater than 1 at box 372. Where the wager count is not greater than 1 at box 372, the controller 260 determines whether a standard deviation value is less than 1 at box 374. However, where the wager count is greater than 1 at box 372, a standard deviation is calculated as $$SD = \sqrt{\frac{\text{Wager count} * \text{sum of squares of wagers} - \text{sum of wagers}^2}{\text{Wager count}(\text{Wager count} - 1)}}$$

at box 376 and the evaluation routine continues to box 374.

Where it is determined at box 374 that the standard deviation is not less than 1, a likelihood factor may be selected as 50%, box 378, and the evaluation routine returns the average wager as the suggested wager amount and 50% as the likelihood factor to the controlling routine 300, shown at box 380. However, where it is determined that the standard deviation is less than 1 at box 374, it may be determined by the controller 260 whether twice the standard deviation is less than 1 at box 382. Where twice the standard deviation is not less than 1, a likelihood factor maybe selected as 84% at box 384, and the average wager may be returned as the suggested wager amount, and 84% may be returned as the likelihood factor at box 380 to the controlling routine 300. Where twice the standard deviation is less than 1 at box 382, a likelihood factor of 98% may be selected in box 386, and the average wager is returned as the suggested wager amount, and 98% may be returned as the likelihood factor at box 380 to the controlling routine 300.

Figure 6:
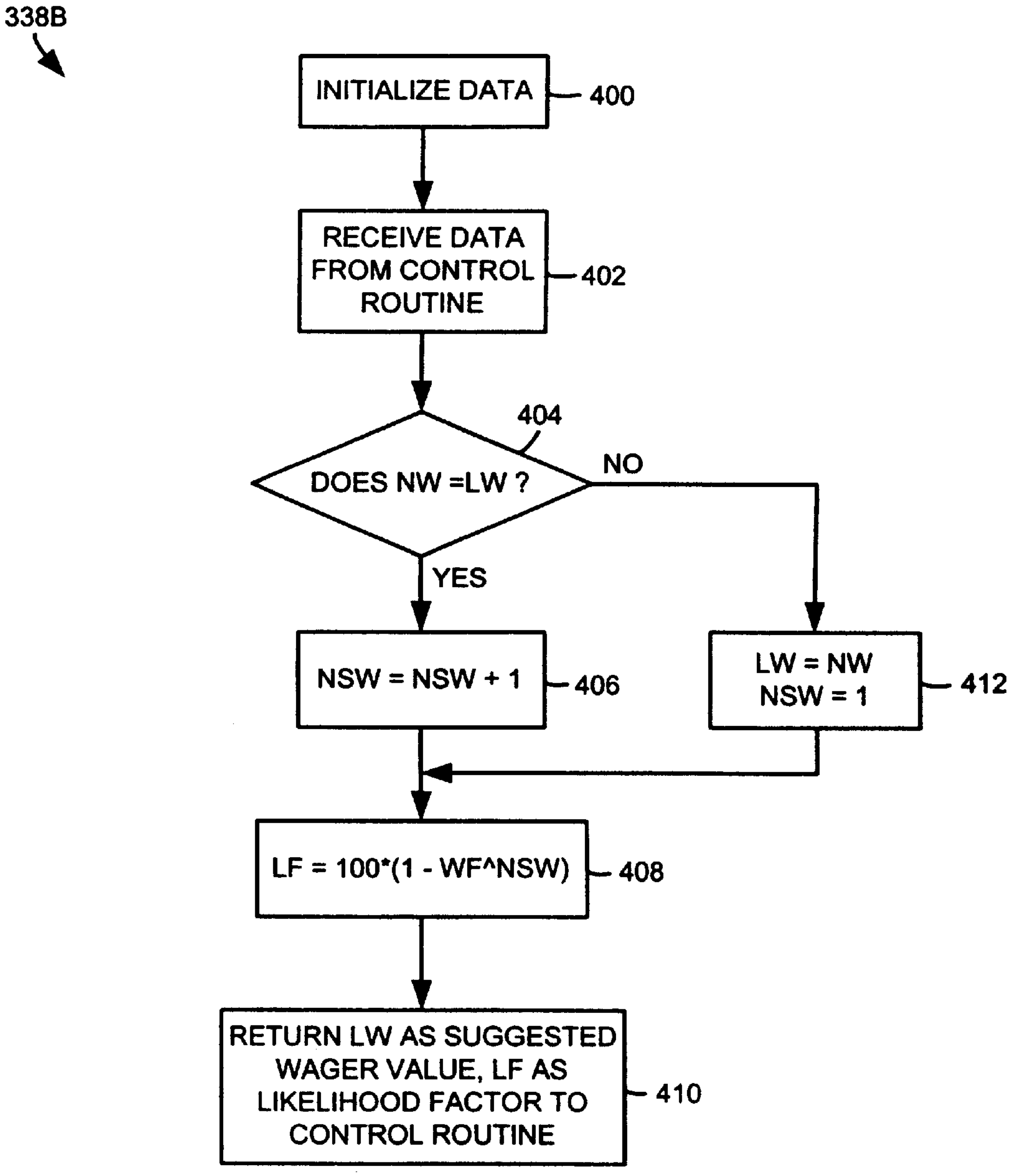
FIG. 6 is a flow chart illustrating a specific evaluation routine based on a player's last 'N' wagers that may be performed by the controller of FIG. 2 in accordance with an embodiment of the invention.

FIG. 6 is a flow chart illustrating a specific evaluation routine 338B implementable on the controller 260, based on a player's last 'N' wagers in accordance with an embodiment of the invention. Data may be initialized to zero at box 400 including a number of same wagers, a last wager and a likelihood factor, and a wager factor is initialized to 0.9. As discussed above with respect to FIG. 4, this data may be initialized the first time the evaluation routine is run such as when a player uses player tracking card or player tracking identification for the first time, or when a player starts a gaming session without using a player tracking card or player tracking identification. Subsequent calls to this routine will begin at box 402.

Data may be received from the controlling routine 300 including a new wager amount at box 402, and the controller 260 determines whether the new wager amount equals a last wager amount at box 404. Where the new wager amount does equal the old wager amount, a number of same wagers is incremented by 1 as shown in box 406, and a likelihood factor may be selected as 1 less the wager factor raised to the power of the number of same wagers, multiplied by 100, at box 408. At box 410, the last wager amount and the likelihood factor calculated at box 408 may be returned as the suggested wager amount and likelihood factor to the controlling routine 300. However, where the new wager amount does not equal the last wager amount at box 404, the last wager amount may be set at the new wager amount and the number of same wagers may be set to 1 at box 412, and the evaluation routine proceeds at box 408 as discussed above.

Figure 7:
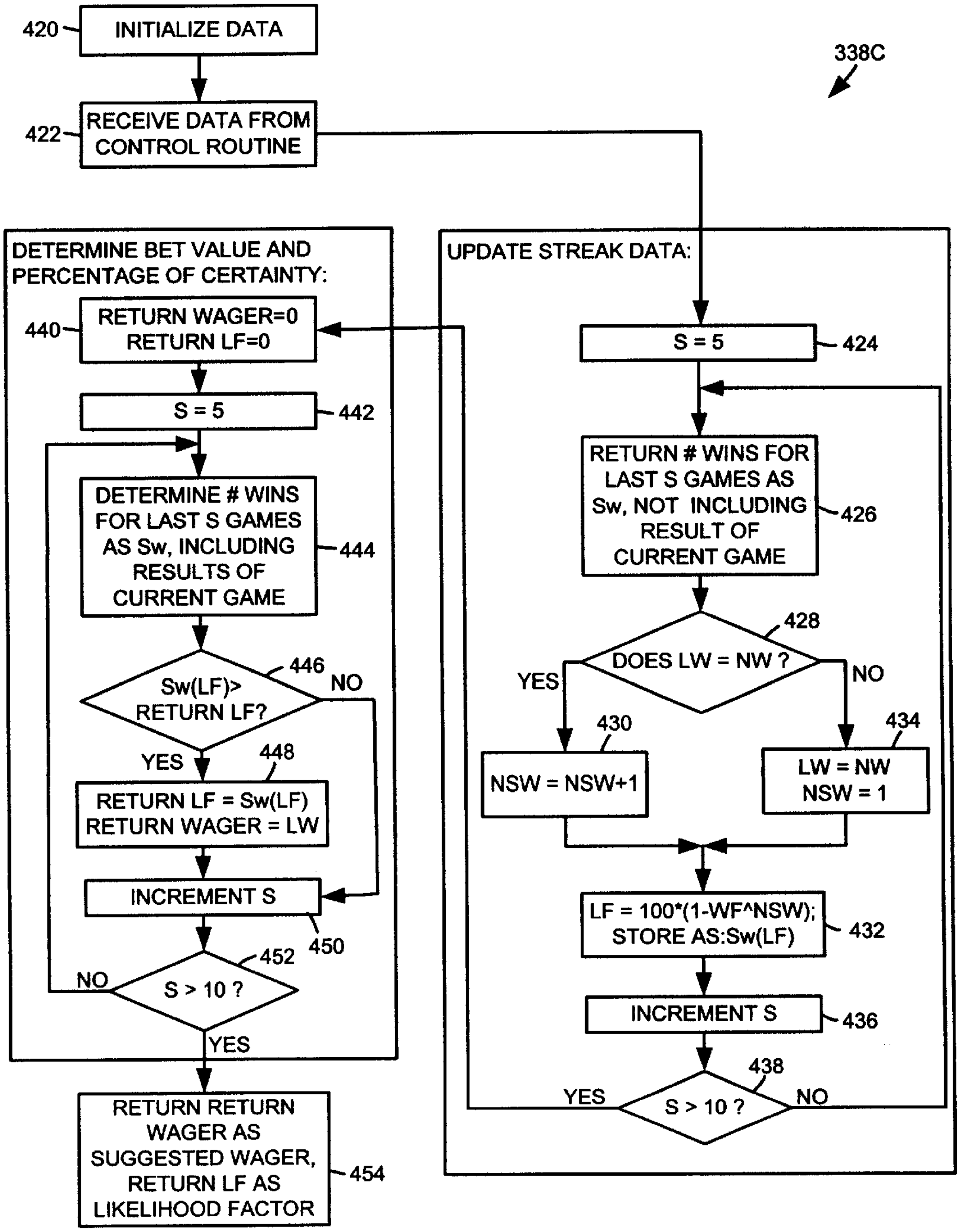
FIG. 7 is a flow chart illustrating a specific evaluation routine based on a player's wagers on winning and losing streaks that may be performed by the controller of FIG. 2 in accordance with an embodiment of the invention.

FIG. 7 is a flow chart illustrating a specific evaluation routine 338C implementable on the controller 260, based on a player's wagers on winning and losing streaks in accordance with an embodiment of the invention. For purposes of this embodiment, streak status is determined from data over the last ten games played by the player. Further and as discussed below, streak data is maintained for streak sizes of 5, 6, 7, 8, 9, and 10 games, as various players may consider themselves in a streak for different percentages of games won and lost.

Data may be initialized at box 420 where a wager factor is set to 0.9, and a last game variable is set to "false." Further, a number of same wagers, a last wager amount, and a likelihood factor are initialized to zero for all of the streak sizes of 5, 6, 7, 8, 9, and 10. As discussed above with respect to FIG. 4, this data may be initialized the first time the evaluation routine is run such as when a player uses player tracking card or player tracking identification for the first time, or when a player starts a gaming session without using a player tracking card or player tracking identification. Subsequent calls to this routine will begin at box 422.

Data may be received from the controlling routine 300 including a new wager amount, and a current game status, where the current game status indicates whether the current game for a player is a win or a loss, as shown at box 422. Streak data may be updated by the controller 260 by storing a likelihood factor for the last wager being a current suggested wager for a particular number of wins out of the last S games, where 5<=S<=10. This is accomplished where S is initialized to 5 at box 424. The controller 260 determines a number of wins for the last S games as $S_w$, not including results of a current game at box 426. It is determined whether the last wager amount is equal to a new wager amount in box 428, where a number of same wagers is incremented by 1 at box 430 where the last wager amount equals the new wager amount. A likelihood factor may then be calculated as 1 less the wager factor to the power of the number of same wagers, multiplied by 100, where the calculated likelihood factor is stored by the controller 260 as $S_w$ (PC) at box 432.

Where the last wager amount does not equal the new wager amount at box 428, the last wager amount is set to be the new wager amount and the number of same wagers is set as 1 at box 434, and the likelihood factor may be calculated as shown in box 432 and discussed above. S is incremented at box 436 and it is determined at box 438 whether S is greater than 10. Where S is not greater than 10, the evaluation routine returns to box 426 and continues as discussed above. Where S is greater than 10 in box 438, the wager amount and likelihood factor are calculated as discussed at boxes 440–452.

At box 440, the RETURN BET and RETURN PC is set to zero. S is set to 5 at box 442, and the controller 260 determines a number of wins from the last S games as $S_w$, including the results of the current game at box 444. In box 446, it is determined by the controller 260 whether $S_w$ (PC)>RETURN PC. Where $S_w$ (PC) is >RETURN PC, RETURN PC is set to $S_w$ (PC) and RETURN BET is set to LB at box 448, and S is incremented by 1 at box 450. It is then determined whether S>10 in box 452 where the evaluation routine proceeds to box 450 and continues as discussed above where S is not greater than 10. Similarly, where $S_w$ (PC) is not greater than RETURN PC in box 446, the evaluation routine proceeds to box 450 and continues as discussed. Where S is greater than 10 in box 452, the controller may return the suggested wager amount as RETURN BET, with a likelihood factor as RETURN PC as shown in box 454.

Although the streak data of this embodiment is maintained over a 10 game window, streak data maybe maintained in a similar fashion for any number of games for determining whether a player is experiencing a streak.

Figure 8:
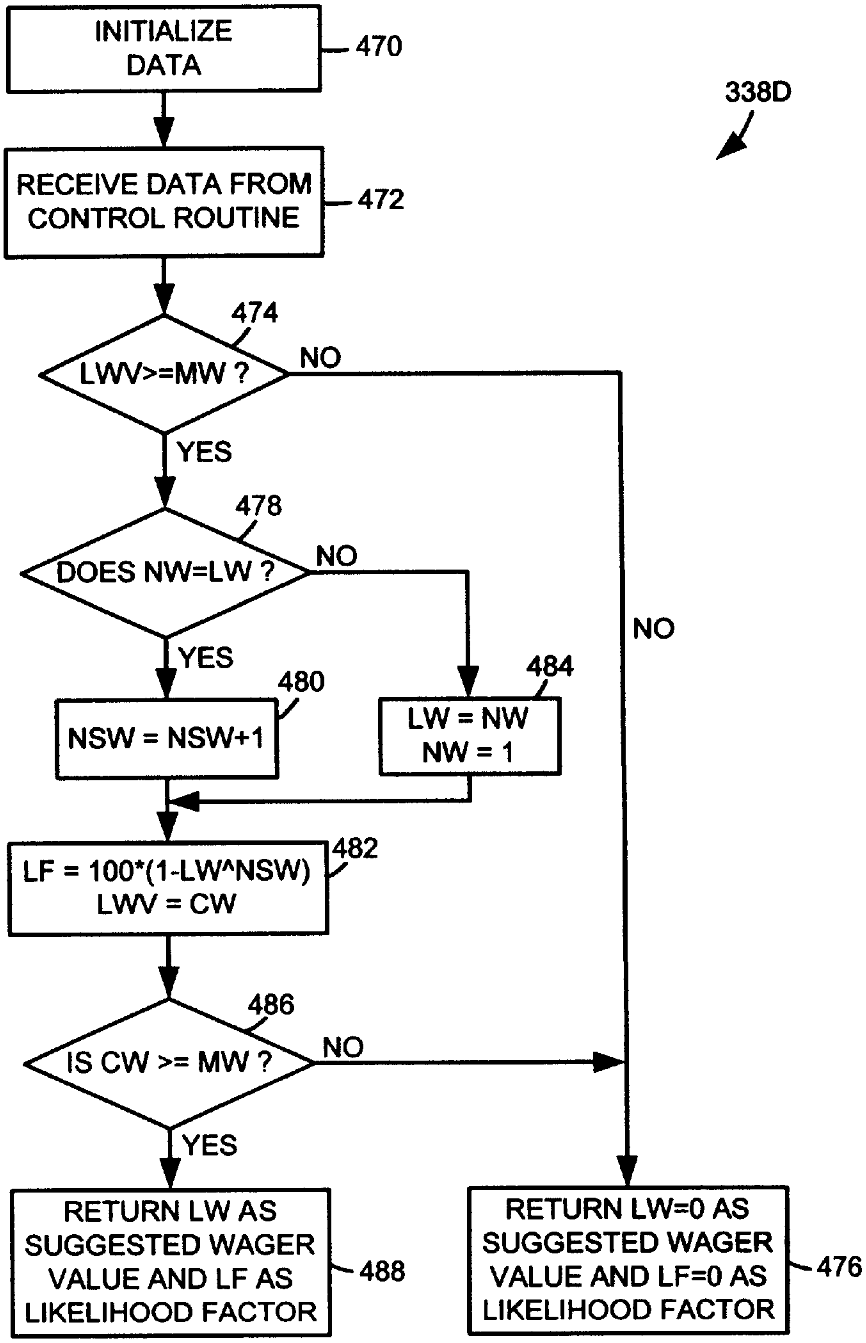
FIG. 8 is a flow chart illustrating a specific evaluation routine based on a player's wagers on a big win that may be performed by the controller of FIG. 2 in accordance with an embodiment of the invention.

FIG. 8 is a flow chart illustrating a specific evaluation routine 338D implementable by the controller 260, based on a player's wagers on a big win in accordance with an embodiment of the invention. Data may be initialized at box 470, including setting a number of same wagers, a last wager, a likelihood factor and a last win to zero, setting a wager factor to 0.9, and setting a minimum win to 50. As discussed above with respect to FIG. 4, this data may be initialized the first time the evaluation routine is run such as when a player uses player tracking card or player tracking identification for the first time, or when a player starts a gaming session without using a player tracking card or player tracking identification. Subsequent calls to this routine will begin at box 472.

Data may be received from the controlling routine 300, including a new wager, and a current win at box 472. It is determined at box 474 whether a last win value is greater than or equal to the minimum win. Where the last win is not greater than or equal to a minimum win, a suggested wager amount of zero and corresponding likelihood factor as zero may be returned to the controlling routine at box 476.

Where the last win is greater than or equal to the minimum win at box 474, the controller 260 determines whether the new wager amount is equal to the last wager amount at box 478. Where the new wager amount is equal to the last wager amount, the number of same wagers is incremented by 1 at box 480, and a likelihood factor may be determined as 1 less the wager factor to the power of the number of same wagers, multiplied by 100, and the last win may be set equal to the current win as shown in box 482. However, where the new wager is not equal to the last wager at box 478, the last wager is set equal to the new wager and the number of same wagers is set as 1, as shown in box 484, and the evaluation routine proceeds to box 482 where a likelihood factor is calculated as discussed above.

It is then determined whether the current win is greater than or equal to a minimum win at box 486, where a last wager amount may be returned as the suggested wager amount having a likelihood factor as the calculated likelihood factor, as shown at box 488. However, where the current win value is not greater than or equal to a minimum win at box 486, the evaluation routine proceeds as shown in box 476, discussed above.

Figure 9:
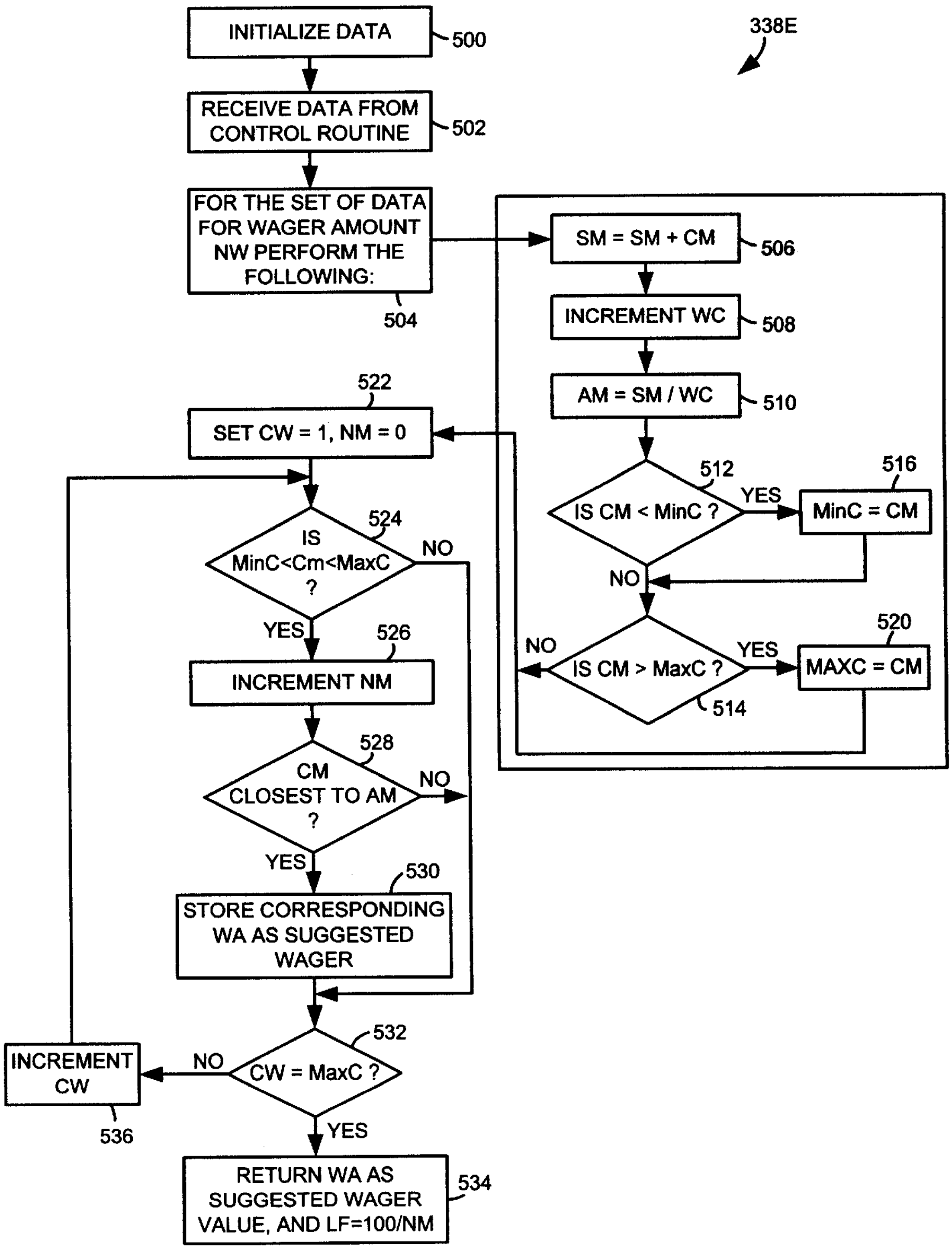
FIG. 9 is a flow chart illustrating a specific evaluation routine based on money in the gaming apparatus that may be performed by the controller of FIG. 2 in accordance with an embodiment of the invention.

FIG. 9 is a flow chart illustrating specific evaluation routine 338E implementable on the controller 260, based on money in the gaming apparatus in accordance with an embodiment of the invention. Data maybe initialized at box 500 by initializing a wager count, sum of credit meters, average credit meter, and maximum credit meter to zero and initializing a minimum credit meter to 1000000. As discussed above with respect to FIG. 4, this data may be initialized the first time the evaluation routine is run such as when a player uses player tracking card or player tracking identification for the first time, or when a player starts a gaming session without using a player tracking card or player tracking identification. Subsequent calls to this routine will begin at box 502.

Data may be received from the controlling routine, including a new wager amount and a credit meter value at box 502. A set of data may be maintained for each new wager amount as shown in box 504. The set of data is calculated by the controller 260 by setting the sum of the credit meters equal to the sum of the credit meters plus the value of the current credit meter at box 506. The wager count is then incremented at box 508, and an average credit meter is determined as the sum of the credit meters divided by the wager count as shown in box 510. It is determined at box 512 whether the credit meter is less than the minimum credit meter. Where it is determined that the credit meter is not less than the minimum credit meter, the controller 260 determines whether the credit meter is greater than the maximum credit meter at box 514. However, where it is determined that the credit meter is less than the minimum credit meter at box 512, the minimum credit meter is set equal to the value of the current credit meter, box 516, and the evaluation routine proceeds to box 514.

At box 514, where it is determined that the credit meter is not greater than the maximum credit meter, the current wager is set to one, and the number of wager amounts is set to zero, box 522, and the number of wager amounts where the minimum credit meter <=the current credit meter value <=the maximum credit meter is determined, as discussed below. However, where the credit meter is greater than the maximum credit meter at box 514, the maximum credit meter is set equal to the value of the current credit meter, box 520, and the evaluation routine proceeds to box 522.

After setting the current wager to one and the number of wager amounts to zero at box 522, it is determined whether the minimum credit meter is <=the current credit meter value <=the maximum credit meter at box 524. Where the minimum credit meter is <=the current credit meter value <=the maximum credit meter at box 524, the number of wager amounts is incremented by one at box 526, and it is determined whether the credit meter is closest to the average meter at box 528. Where the credit meter is closest to the average meter at box 528, the corresponding wager amount is stored as the suggested wager value at box 530, and it is determined at box 532 whether the current wager is equal to the maximum credit meter.

Where the current credit meter value is not >=the minimum credit meter and not <=the maximum credit meter at box 524, flow continues to box 532. Similarly, where it is determined that the credit meter is not the closest to the average meter at box 528, flow continues to box 532 as discussed above.

Where it is determined at box 532 that the current wager is not equal to the maximum credit meter, the current wager is incremented at box 536 and flow returns to box 524. However, where it is determined that the current wager is equal to the maximum credit meter at box 532, the corresponding wager amount is returned as the suggested wager value, where the likelihood factor is returned as 100 divided by the number of wager amounts for which the minimum credit meter <=the value of the current credit meter <=the maximum credit meter, shown at box 534.

Figure 10:
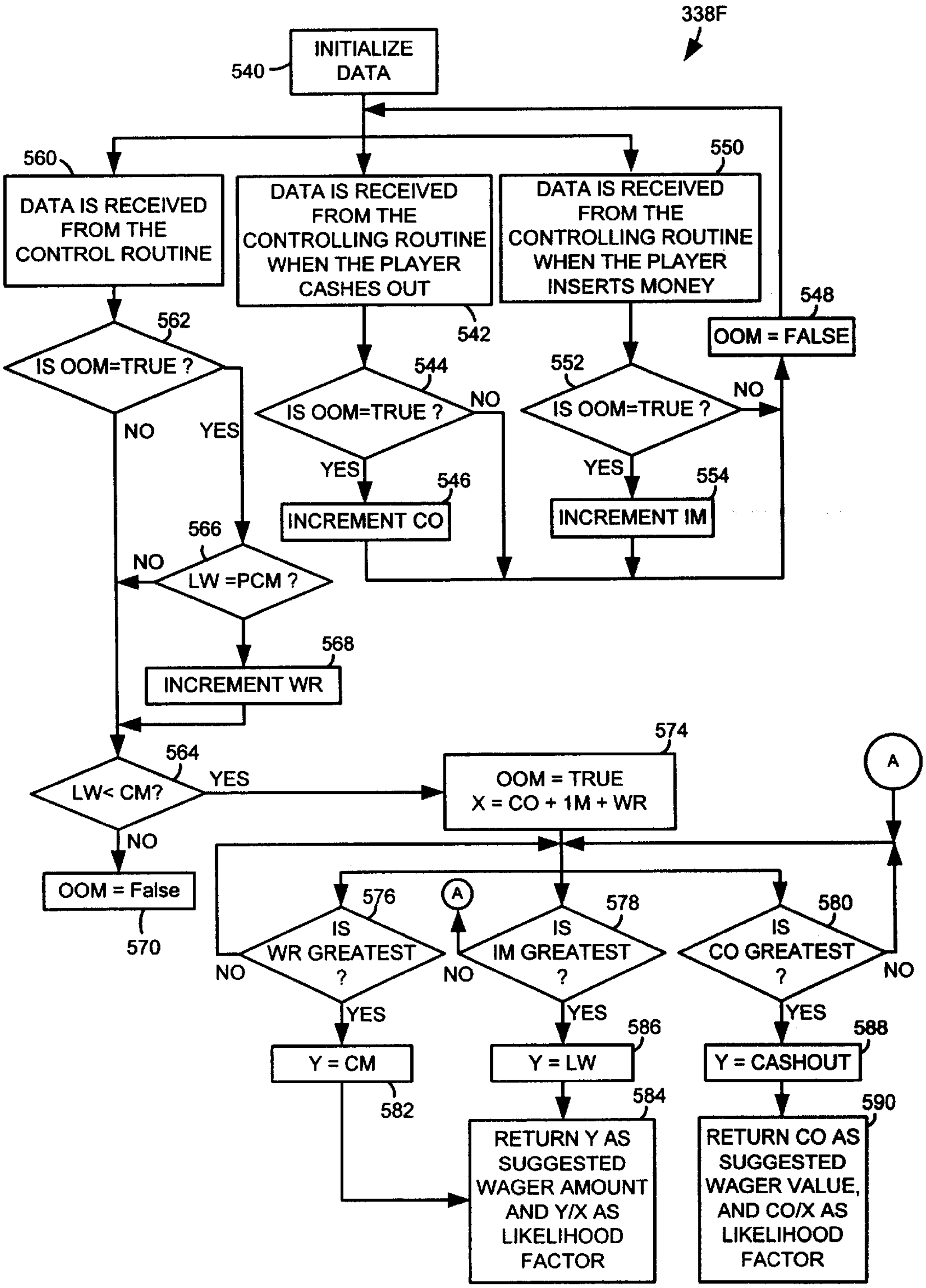
FIG. 10 is a flow chart illustrating a specific evaluation routine based on a player's wagers when the player is running out of money that may be performed by the controller of FIG. 2, in accordance with an embodiment of the invention.

FIG. 10 is a flow chart illustrating a specific evaluation routine 338F implementable on the controller 260, based on a player's wagers when the player is running out of money, in accordance with an embodiment of the invention. Data may be initialized at box 540 by setting the cash out count, the insert money count, the wager remainder count, and previous credit meter to zero, and by setting the 'out of money last time' equal to 'false'. As discussed above with respect to FIG. 4, this data may be initialized the first time the evaluation routine is run such as when a player uses player tracking card or player tracking identification for the first time, or when a player starts a gaming session without using a player tracking card or player tracking identification. Subsequent calls to this routine will begin at boxes 542, 550 or 560 depending on game circumstances, as discussed below.

The data received from the controlling routine 300 depends upon particular game circumstances encountered by the player. For example, when the player cashes out as shown at box 542, data indicating whether the player was out of money for the last wager is received from the controlling routine and it is determined whether the 'out of money last time' is equal to 'true' at box 544. Where the 'out of money last time' equals 'true', the cash out count is incremented at box 546 and the 'out of money last time' is set to 'false' at box 548. However, where the 'out of money last time' does not equal true at box 544, the routine proceeds to box 548.

When the player inserts money, data indicating whether the player was out of money for the last wager is received from the controlling routine as shown in box 550, where it is determined by the controller 260 whether the 'out of money last time' is equal to 'true' at box 552. Where the 'out of money last time' is equal to 'true' at box 552, the insert money count is incremented at box 554 and the routine proceeds to box 548 discussed above. Where the 'out of money last time' is not equal to 'true' at box 552, the evaluation routine proceeds to box 548.

When the player is not cashing out or inserting money, or after boxes 542–548 or 550–548 discussed above have been performed, the last wager amount and credit meter value data is received from the controlling routine at box 560, and it is determined whether the 'out of money last time' is equal to 'true' at box 562. Where the 'out of money last time' is not equal to 'true', the controller 260 determines whether the last wager is less than the current credit meter value at box 564. However, where the 'out of money last time' is equal to 'true' at box 562, it is determined whether the last wager is equal to the previous credit meter at box 566. Where the last wager is not equal to the previous credit meter, the routine proceeds to box 564. However, where the last wager is equal to the previous credit meter at box 566, the wager remainder count is incremented at box 568, and the routine proceeds to box 564.

At box 564, where it is determined that the last wager is not equal to the credit meter value, the 'out of money last time' is set to 'false' at box 570. Where the last wager is determined to be less than the value of the current credit meter at box 564, the 'out of money last time' is set as 'true', and the cash out count, insert money count, and wager remainder count are summed as a value 'X,' as shown at box 574. The cash out count, insert money count and wager remainder count are then compared with one another to determine which has the greatest value, as shown at boxes 576, 578 and 580. At box 576, it is determined whether the wager remainder count is the greatest. Where the wager remainder count is the greatest, 'Y' is set equal to the current credit meter at box 582, and Y may be returned to the controlling routine 300 as the suggested wager amount, and Y/X may be returned as the likelihood factor as shown at box 584.

At box 578, it is determined whether the IM is the greatest of the cash out count, insert money count and wager remainder count. Where IM is the greatest, 'Y' is set equal to the last wager, as shown at box 586, and the routine proceeds to box 584 as discussed above.

At box 580, it is determined whether the cash out count is the greatest of the cash out count, the insert money count and the wager remainder count. Where the cash out count is the greatest, 'Y' is set to CASH OUT at box 588, and CASH OUT may be returned as a suggested action to the control routine 300, and the cash out count/X may be returned as the likelihood factor as shown at box 590.

In accordance with another embodiment of the invention, a specific evaluation routine implementable on the controller 260 is based on a player's first wager for a particular gaming session. In accordance with this embodiment, the evaluation routines of FIG. 5 or 6 may be utilized, where the only data received by the corresponding evaluation routine from the controlling routine 300 includes the first wager made by the player for a particular gaming session.

One or more of the specific evaluation routines discussed above may be called from the controlling routine 300 in determining a suggested wager amount. At box 340 of the controlling routine 300, the controller 260 determines the suggested wager amount from the one or more specific evaluation routines having the highest likelihood factor and selects that suggested wager amount for the suggested wager amount discussed above with reference to box 330. Where the player is using a player tracking card or player tracking identification, player tracking data from previous gaming sessions may be retrieved from the player tracking card, or from a central data base having information corresponding to the player as referenced by the payer tracking card or player identification. Where the player is not using a player tracking card or player identification, player tracking for the current gaming session maybe stored locally at the gaming apparatus, or at a central data base and referenced by the gaming apparatus used by the player.

In accordance with a further embodiment, box 340 of the controlling routine 300 may include conflict resolution functionality where two or more of the specific evaluation routines provide an equal, highest likelihood factor for their respective suggested wager amounts to the controlling routine 300. Such conflict resolution functionality may be implemented by assigning each specific evaluation routine a priority. Thus, where more than one specific evaluation routine provides the highest likelihood factor, the controller 260 selects the suggested wager amount from the specific evaluation routine having the highest priority.

Game Selection

Figure 11:
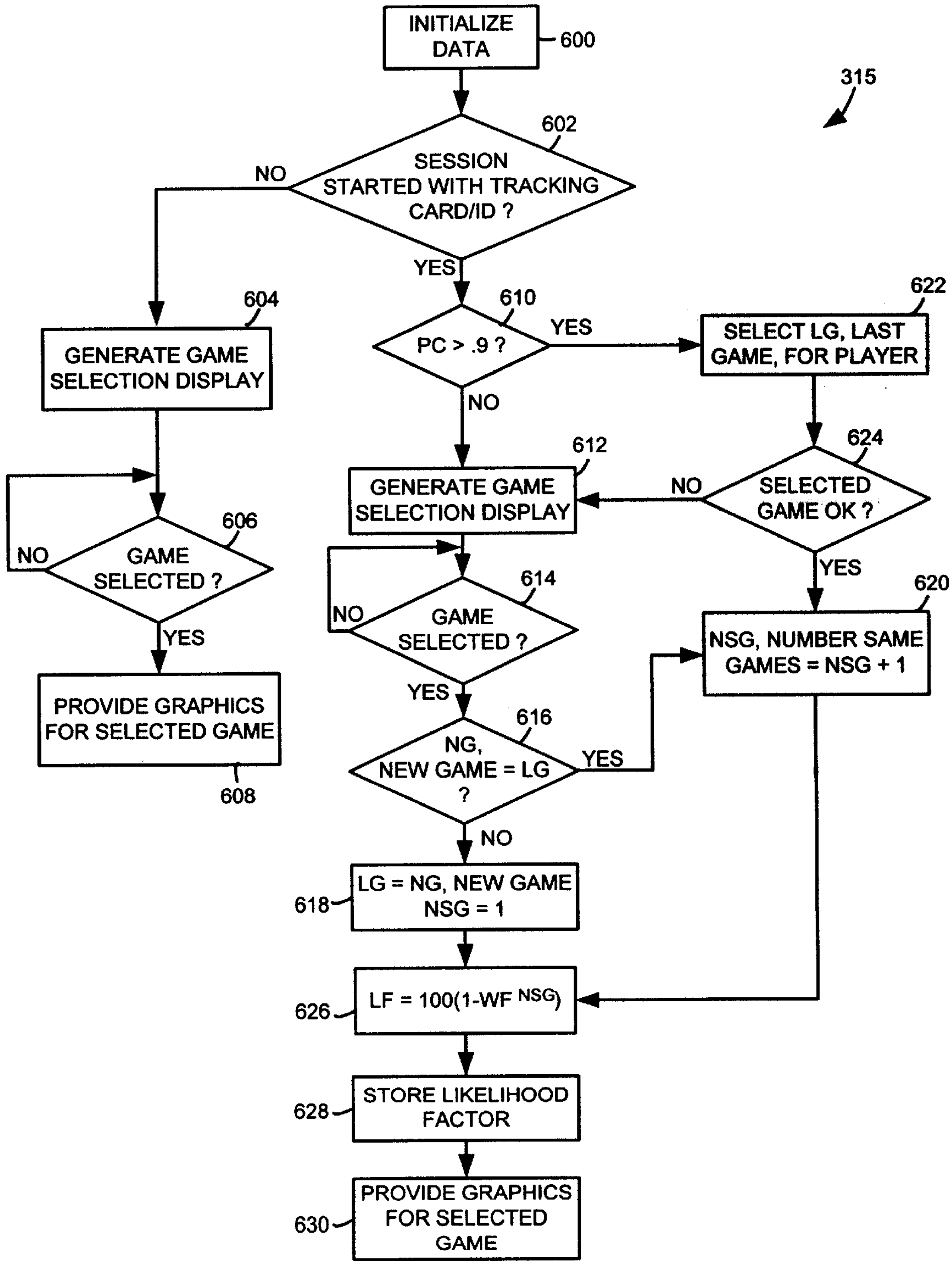
FIG. 11 is a flow chart illustrating game selection including selection of a player's favorite game that may be performed by the controller of FIG. 2 in accordance with an embodiment of the invention.

FIG. 11 illustrates game selection, as performed by the controller 260 in accordance with an embodiment of the invention. Specifically, player tracking may be implemented by the controller 260 in the game selection by selecting the player's favorite game. The flow chart of FIG. 11 is typically implemented at box 315 of the controlling routine 300 of FIG. 3. At box 600, data may be initialized including setting a last game chosen, number of same games, and percentage of certainty to zero.

At box 602, it is determined whether the gaming session was initiated using a player tracking card/player tracking identification. Where the gaming session was not initiated using a player tracking card or player tracking identification, a game-selection graphic may be generated on the display 222 at shown at box 604. The game-selection graphic may include a list of video casino games that may be played on the electronic gaming apparatus 42. Further, the controller 260 may cause a message to be shown on the display 222 prompting the player to select one of the list of games provided in the game-selection graphic. At box 606, it is determined whether a game has been selected by the player. Where a game has not been selected, the game selection routine remains at box 606. Where a game is selected at box 606, graphics are provided for the selected game as shown in box 608.

At box 602, where the session is initiated with a player tracking card or player tracking identification, player tracking information corresponding to the player is retrieved indicating the player's game selection from previous gaming sessions, including a number of same games, a last game selected and a likelihood factor, and it is determined whether the likelihood factor is greater than 0.9 at box 610. Where the percentage of certainty is not greater than 0.9, a game selection display is generated as shown at box 612 similar to as described above with respect to box 604. At box 614 it is determined whether the player has selected a game similar to as discussed above with respect to box 606. Where no game is selected, the routine remains at box 614. Where a game has been selected by the player at box 614, it is determined whether the new game selected is equal to the last game selected at box 616. Where the new game is not equal to the last game, the last game is set equal to the new game, and the number of same games is set equal to 1 as shown at box 618. However, where the new game is equal to the last game, the number of same games is incremented by 1 as shown at box 620.

Where the likelihood factor is greater than 0.9 at box 610, a last game is selected for the player as shown at box 622. At box 624, it is determined whether the selected game is OK, that is, is a desired game for the player. This may be determined by querying the player. Where the selected game is not desired by the player, the routine proceeds to box 612 and continues as discussed above. However, where the selected game is OK, and thus is the desired game for the player at box 624, the routine continues to box 620 and proceeds as discussed above.

At box 626, a likelihood factor maybe calculated as 1 less the wager factor raised to the power of the number of same games, multiplied by 100. The likelihood factor is stored by the controller 260 as shown at box 628, for example on the player tracking card or a central data base corresponding to the player tracking card or player identification, and graphics are provided for the selected game as shown at box 630.

Selecting Pay Table

Figure 12A:
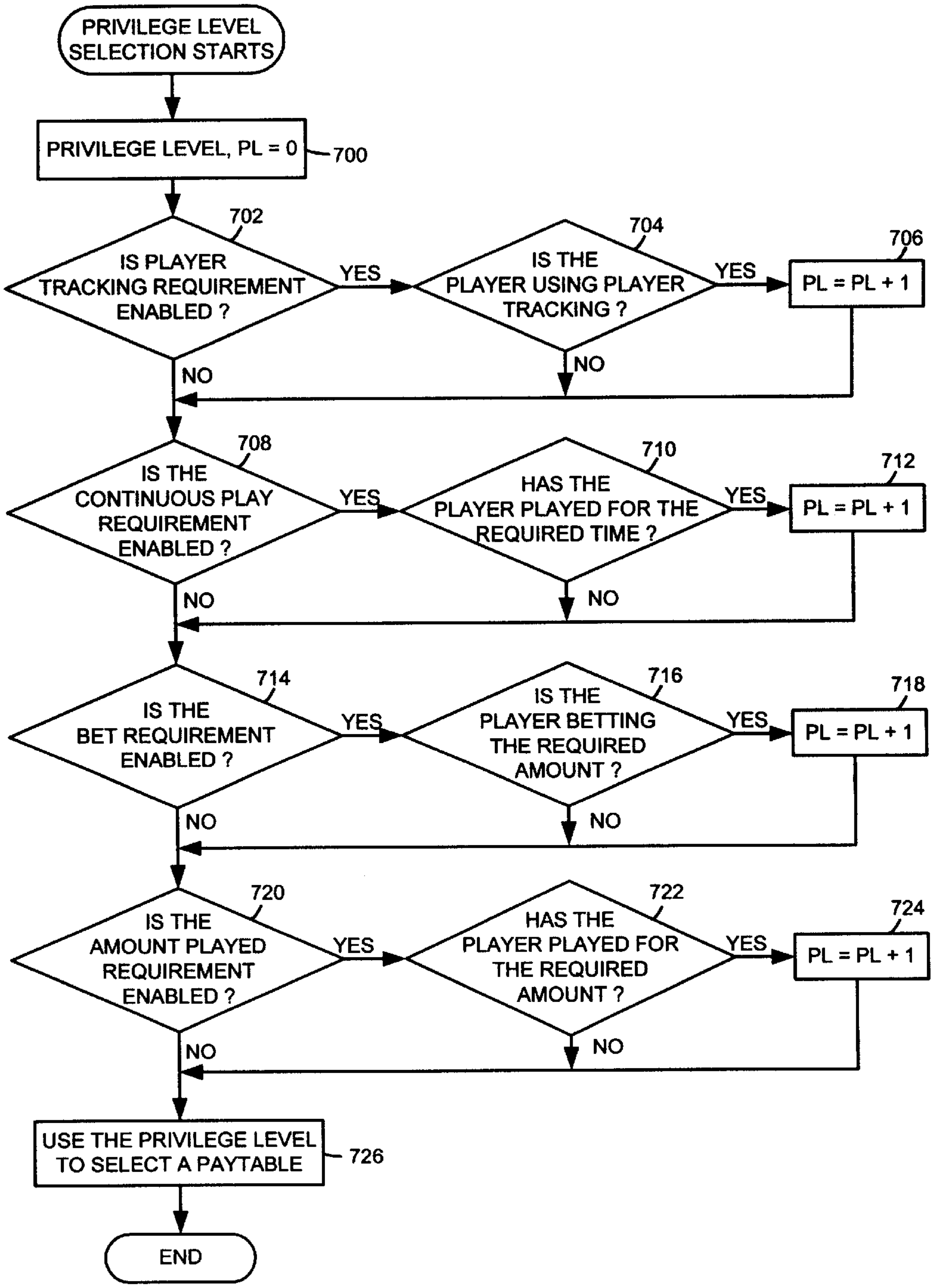
FIG. 12A is a flow chart illustrating player tracking for implementation of pay table configuration that may be performed by the controller of FIG. 2 in accordance with an embodiment of the invention.

FIG. 12A is a flow chart illustrating player tracking for implementing pay table configurations in accordance with another embodiment of the invention. The various requirements and thresholds discussed with respect to the flow chart of FIG. 12A are shown by way of example in the Tables of FIGS. 12B and 12C, which will be discussed further below. The routine of FIG. 12A may be implemented in conjunction with box 333 of the controlling routine 300 of FIG. 3.

At box 700, a privilege level is set to zero. It may be determined whether the player tracking requirement is enabled at box 702. Where the player tracking requirement is enabled, it is determined whether the player is using player tracking, for example via a player tracking card or player identification, shown at box 704. Where the player tracking requirement is not enabled at box 702, or where the player is not using player tracking at box 704, the routine proceeds to box 708 where it may be determined whether the continuous player requirement is enabled. Where the player is using player tracking at box 704, the privilege level may be incremented by 1 at box 706, and the routine proceeds to box 708.

Where it is determined at box 708 that the continuous play requirement is enabled, it is determined whether the player has played for the required time at box 710. Where the continuous play requirement is not enabled at box 708, or where the player has not played for the required time at box 710, the routine proceeds to box 714 where it may be determined whether the wager requirement is enabled. However, where the player has played for the required time, the privilege level may be incremented by 1 at box 712, and the routine proceeds to box 714.

Where it is determined that the wager requirement is enabled in box 714, it may be determined whether the player is wagering the required amount at box 716. Where the player is not wagering the required amount at box 716, or where the wager requirement is not enabled at box 714, the routine proceeds to box 720 where it may be determined whether the amount played requirement is enabled. However, where the player is wagering the required amount at box 716, the privilege level may be incremented by 1 at box 718 and the routine proceeds to box 720.

At box 720, where it is determined that the amount played requirement is enabled, it is determined whether the player has played the required amount at box 722. Where the player has not played the required amount at box 722, or where the amount played requirement is not enabled at box 720, the routine proceeds to box 726 where the current privilege level may be used to select a pay table. Where the player has played the required amount at box 722, the privilege level may be incremented by 1 at box 724 and the routine proceeds to box 726.

Figures 12B, 12C, 13:
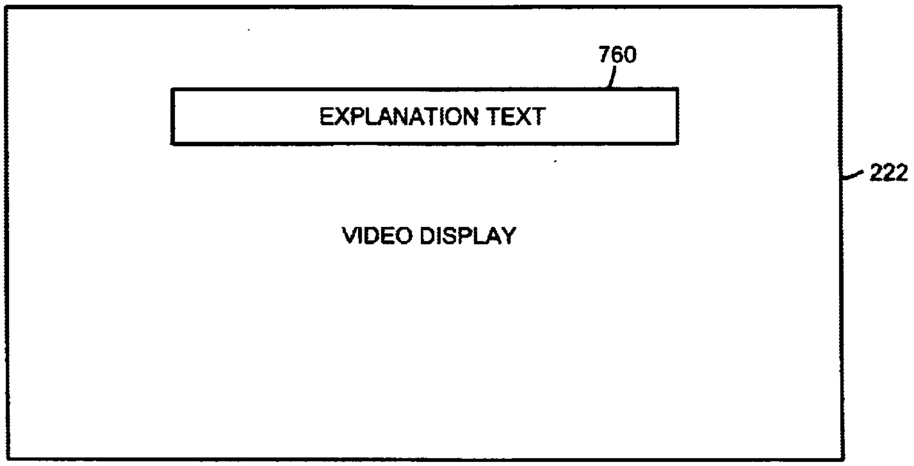
FIG. 12B illustrates a table showing example privilege level requirements and corresponding thresholds in accordance with an embodiment of the invention.
FIG. 12C illustrates a table showing pay table selection based on privilege levels achieved by the player in accordance with an embodiment of the invention.
FIG. 13 illustrates an explanation message display in accordance with another embodiment of the invention.

FIG. 12B illustrates a table showing example privilege level requirements and corresponding thresholds in accordance with an embodiment of the invention. Specifically, the table of FIG. 12B illustrates that the various requirements may be enabled by the casino, and that particular thresholds for the specific requirements may be set.

Various privilege level requirements, for example the privilege level requirements shown at 730, 732, 734 and 736 may be configured by the casino, as show by the corresponding configurations 731, 733, 735 and 737 to determine the players privilege level and thus corresponding pay table to be used for the player. For example, the player tracking requirement 730, discussed with respect to box 702 of FIG. 12A is shown having a corresponding configuration 731 as enabled.

The continuous play requirement 732, such as that discussed above with respect to box 708 of FIG. 12A, is shown as having a corresponding configuration 733 as being enabled, with a threshold required time (box 710 of FIG. 12A) as 45 minutes. The wager requirement 734, for example as discussed above with respect to box 714 of FIG. 12A, is shown with a corresponding configuration 735 of enabled, where the required wager amount (box 716 of FIG. 12A) is set at 5 credits. Further, an amount played requirement 736, for example as discussed above with respect to box 720 of FIG. 12A, is shown with a corresponding configuration 737 as being enabled, having a required played amount (box 722 of FIG. 12A) of 500 credits minimum. Further shown by the configuration 737, this configuration may include further limitations, for example a time limit to reach a particular threshold. For example, the configuration 737 requires no time limit for the player to reach 500 credits played in order to achieve a higher privilege level. Alternatively, and not shown, one skilled would realize that such a limitation may need to be met within a pre-determined time limit.

FIG. 12C illustrates a table showing pay table selection based on privilege levels achieved by the player in accordance with an embodiment of the invention. Such a table selection may occur for example at box 726 of FIG. 12A.

For example, as shown at 740 and 741, a player achieving a privilege level of zero earns pay table A, which provides an 80% payout. Similarly, privilege levels 742, 744, 746, 748, and 750, corresponding to pay tables 743, 745, 747, 749 and 751 maybe earned by the player providing payouts of 82%, 84%, 86%, 88%, and 90%, respectively.

Although four privilege level requirements are shown with respect to FIGS. 12A–12C, one skilled would realize that any number of privilege level requirements may be used. Thus, the privilege level requirements discussed with respect to FIGS. 12A–12C are exemplary only, and more or less privilege level requirements may be used in the pay table determination. Further, where privilege level requirements are no longer met by a player, the player's privilege level and thus the corresponding pay table selected for the player may be reduced.

Explanation Messages

FIG. 13 illustrates an explanation message display in accordance with another embodiment of the invention. The explanation message display maybe displayed on the display area 222 of FIG. 1. In FIG. 13, an explanation text box 760 is shown for display on the video display 222. The text within the explanation text box 760 provides an explanation to the player why a certain action was automatically chosen.

For example, when a player starts a gaming session utilizing a player tracking card or player tracking identification, and the controlling routine selects the game automatically, a message such as "Selecting your favorite game—Press the menu button to change games" may be displayed. Additionally, where a player's privilege level is increased, thereby increasing pay table payout, a message such as “Your privilege level has increased due to the amount played” may be displayed informing the player of the higher paying pay table being in effect.

Further, such messages may be utilized where a wager amount is selected automatically for the player. For example, where the player is running out of money and the evaluation routine based on player’s wagers when the player is running out of money indicates that the player wagers the amount of credits left, a message such as “Betting the amount left” may be displayed on the display 222. In addition, where a specific routine based on wagers after a big win indicates the player increases a wager amount after a big win, a message such as “Betting up due to the big win” may be displayed, indicating to the player why the wager amount has increased. Further, where the evaluation routine based on the amount of money in the gaming apparatus indicates that the player will decrease his wager, a message such as “Betting down due to the amount of money left” may be displayed on the display 222. The messages discussed above are, by way of example, as any message describing to the player a reason for an automatic action or selection by the gaming apparatus may be displayed.

FIGS. 14–23 are flow charts illustrating operation of games which maybe initiated by the player in the controlling routine 300, including the player tracking in accordance with embodiments of the invention.

Poker

Figure 14:
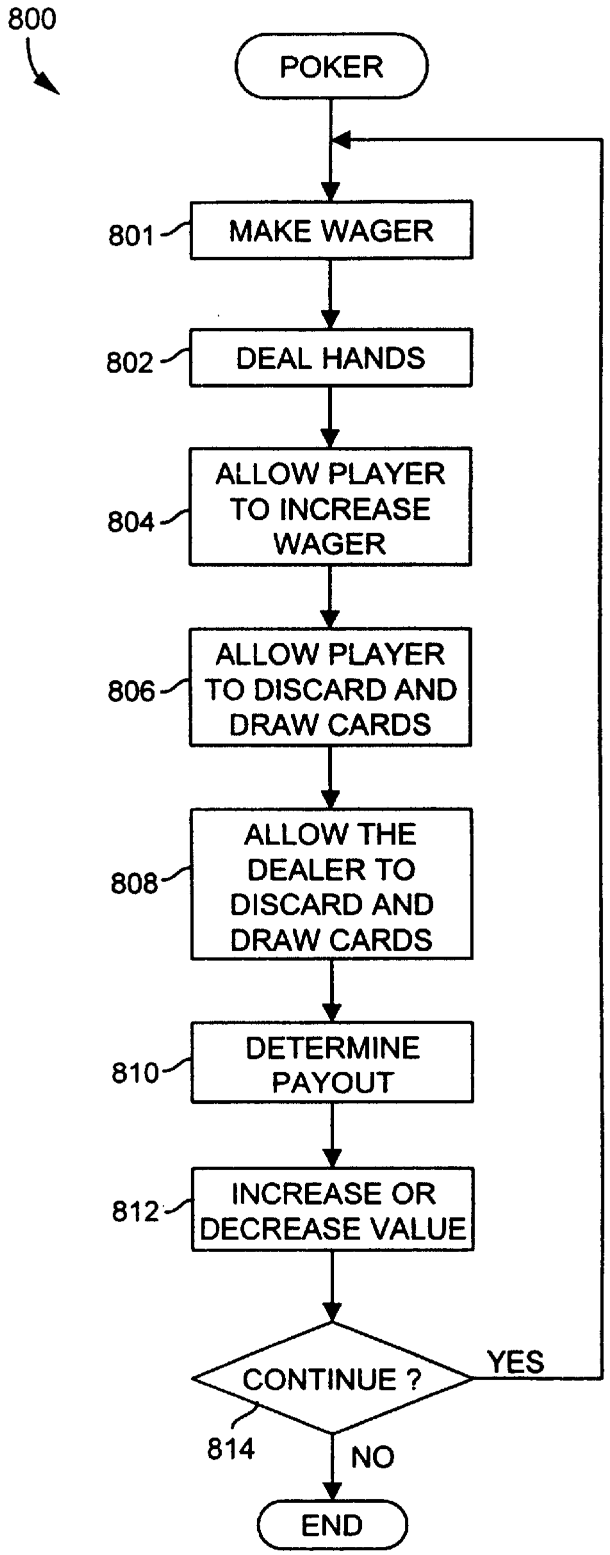
FIG. 14 is a flowchart of a poker routine that may be performed by the controller of FIG. 2.

FIG. 14 is a flowchart of a poker routine 800 which may be selected at box 315 of the controlling routine of FIG. 3. The poker routine 800 may be selected by the player, or automatically selected for the player using player tracking, as discussed above with respect to FIG. 11. Referring to FIG. 14, at block 801 the controller 260 may cause a display to be generated on the display 222 to prompt the player to make a wager. This prompt for a wager may include a suggested wager amount for the player using the player tracking described above with respect to boxes 330–340 of FIG. 3, and FIGS. 4–10. After a wager is entered, the controller 260 may cause a pair of virtual poker hands of cards to be “dealt” to the player and to the dealer at block 802 by causing the display 222 to display the virtual hands. After the virtual hands have been “dealt,” the player may have an opportunity at block 804 to increase the initial wager made at the block 800. A suggested increase in wager amount may be provided by the controller 260 using player tracking, for example similar to as described in one or more of the specific evaluation routines discussed above, as would be understood by one skilled in the art. At block 806, the player may be allowed to discard and draw new cards in an attempt to improve the player’s poker hand, and at block 808 the dealer (which may be, for example, the electronic gaming apparatus 42) may be allowed to discard and draw new cards in an attempt to improve the dealer’s poker hand.

At block 810, the controller 260 may determine the outcome of the poker game and a corresponding payout. As discussed above with respect to FIGS. 12A–12C, player tracking maybe utilized in determining the payout table. If the player has won the game (i.e., the player’s hand is better than the dealer’s hand), the payout will be positive. If the player has not won the game, the player may forfeit the wager(s) made at the blocks 801 and/or 804. At block 812, the controller 260 may increase or decrease the player’s value based on the results of the poker game as determined at the block 810. At block 814, the controller 260 may cause a message to be displayed on the display 222 asking whether the player desires to continue playing the video poker game. Box 814 corresponds to Box 342 of FIG. 3, where the selected game is Poker. If the player desires to continue, the routine may branch back to block 801. If the player does not desire to continue play, the poker routine 800 may end and the controller 260 may cause block 344 of FIG. 3 to be performed.

Figure 15:
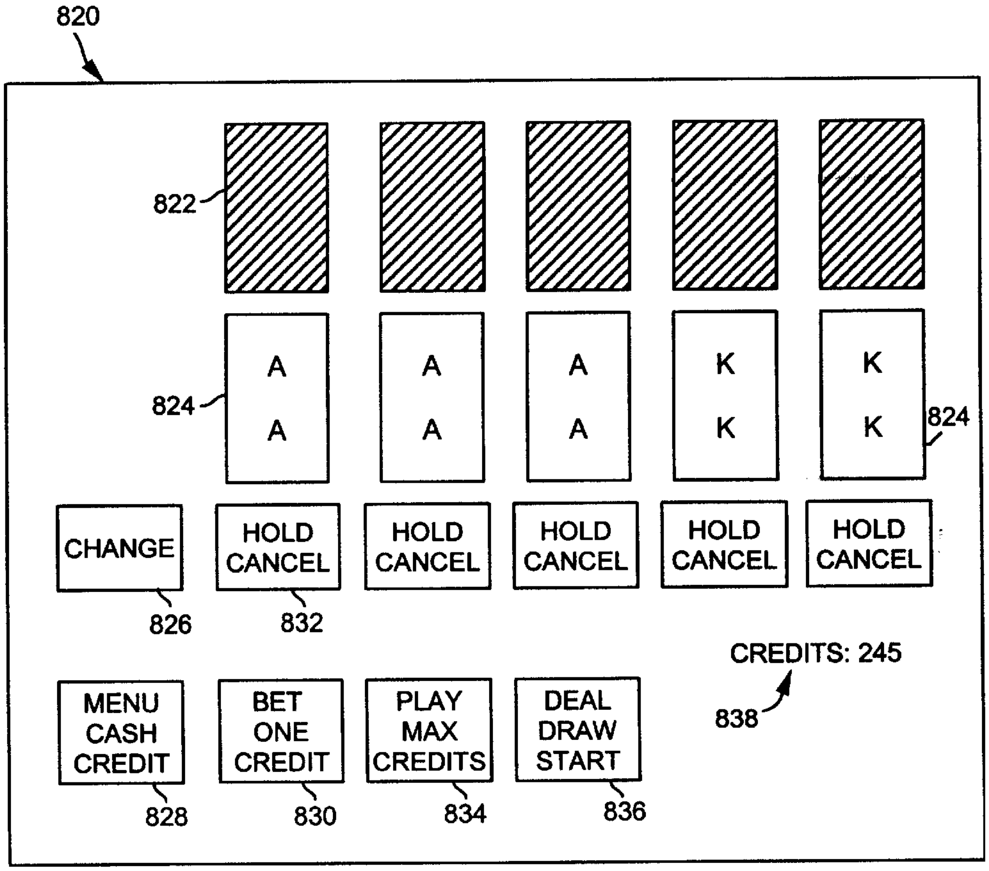
FIG. 15 is an illustration of a visual display that may be displayed when the controller of FIG. 2 performs the poker routine of FIG. 14.

FIG. 15 illustrates an exemplary display 820 that may be shown on the display 222 during performance of the poker routine 800. Referring to FIG. 15, the display may include video images representative of a plurality of cards 822 in a dealer’s hand, which may be shown face down, and a plurality of cards 824 in a player’s hand, which may be shown face up. To allow the player to control the play of the poker game, a plurality of player-selectable button graphics may be displayed. For example, button graphics for change 826, menu, cash out and credit 828, and wager one credit 830 maybe displayed. Further, button graphics for hold/cancel 832 may be displayed, each of which may pertain to a particular one of the player’s cards 824. Button graphics for play max credits 834 and deal/draw 836 may also be displayed. A graphic 838 representing the number of player credits may also be displayed to inform the player of the number of credits that he or she has remaining.

Although not shown, other buttons may be provided for the player as well. For example, buttons for increasing and decreasing the wager amount may be provided such that, when a suggested wager amount is determined and displayed by the controller 260, the player may increase or decrease the suggested wager amount to a different value if necessary.

Blackjack

Figure 16:
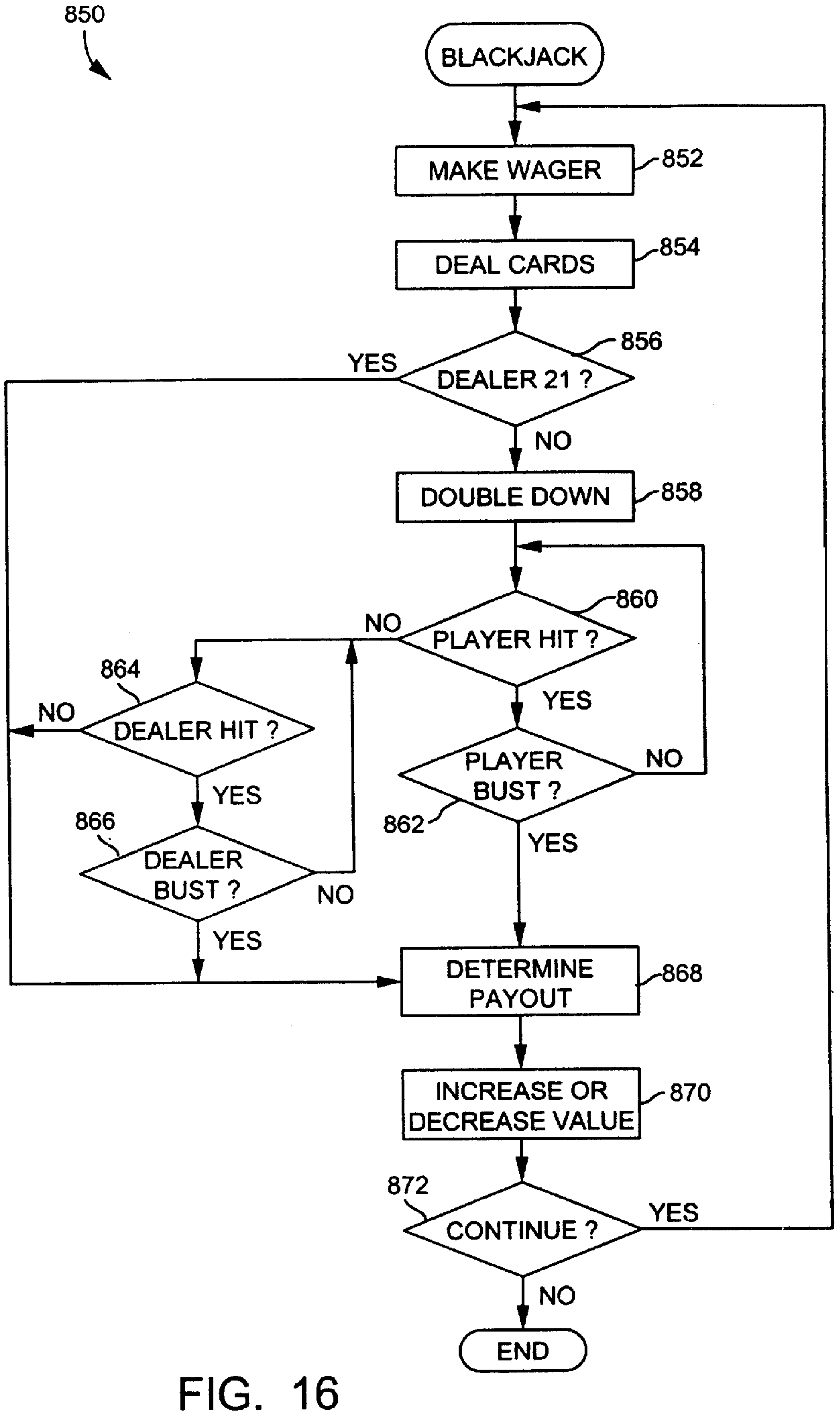
FIG. 16 is a flowchart of blackjack routine that maybe performed by the controller of FIG. 2.

FIG. 16 is a flowchart of a blackjack routine 850 which may be selected at box 315 of controlling routine of FIG. 3. The blackjack routine 850 may be selected by the player, or automatically selected for the player using player tracking, as discussed above with respect to FIG. 11. Referring to FIG. 16, the blackjack routine 850 may begin at block 852 at which a player may make a wager on the outcome of the blackjack game. The player may accept a suggested wager provided by the controller 260 using the player tracking described above with respect to boxes 330–340 of FIG. 3, and FIGS. 4–10, or enter a wager amount for that game. After the player has made a wager, at block 854 the controller 260 may cause virtual cards to be “dealt” to both the player and the dealer (which may be the gaming apparatus 42), against which the player is playing.

After the cards are dealt, at block 856 the controller 260 may determine whether the dealer has a hand that totals 21. If the dealer’s hand is not 21, at block 858 the controller 260 may cause the display 222 to generate a display asking whether the player would like to double down. At block 860, the controller 260 may allow the player to be “hit” (i.e., dealt an additional virtual card). If the player is hit, block 862 may determine if the player has “bust” (i.e., has exceeded 21). If the player has not bust, block 860 may be performed again to allow the player to be “hit” again.

If the player decides not to hit at block 860, the controller 260 may determine whether the dealer wants to be hit at block 864. If the dealer hits, at block 866 the controller 260 may determine whether the dealer has bust. If the dealer has not bust, block 864 may be performed again to allow the dealer to be “hit” again. If the dealer decides not to hit, at block 868 the controller 260 may determine the outcome of the blackjack game and a corresponding payout. For example, the controller 260 may determine which of the player or the dealer has the higher hand that does not exceed 21. The payout table for the payout may be determined using player tracking as discussed above with respect to FIGS. 12A–12C.

At block 870, the controller 260 may increase or decrease the player's value based on the results of the blackjack game as determined at the block 868. At block 872, the controller 260 may cause a message to be displayed on the display 222 asking whether the player desires to continue playing the video blackjack game. Box 872 corresponds to Box 342 of FIG. 3, where the selected game is Blackjack. If the player wishes to continue playing Blackjack, the routine may branch back to block 852. If not, the blackjack routine 322 may end and the controller 260 may cause block 346 of FIG. 3 to be performed.

Figure 17:
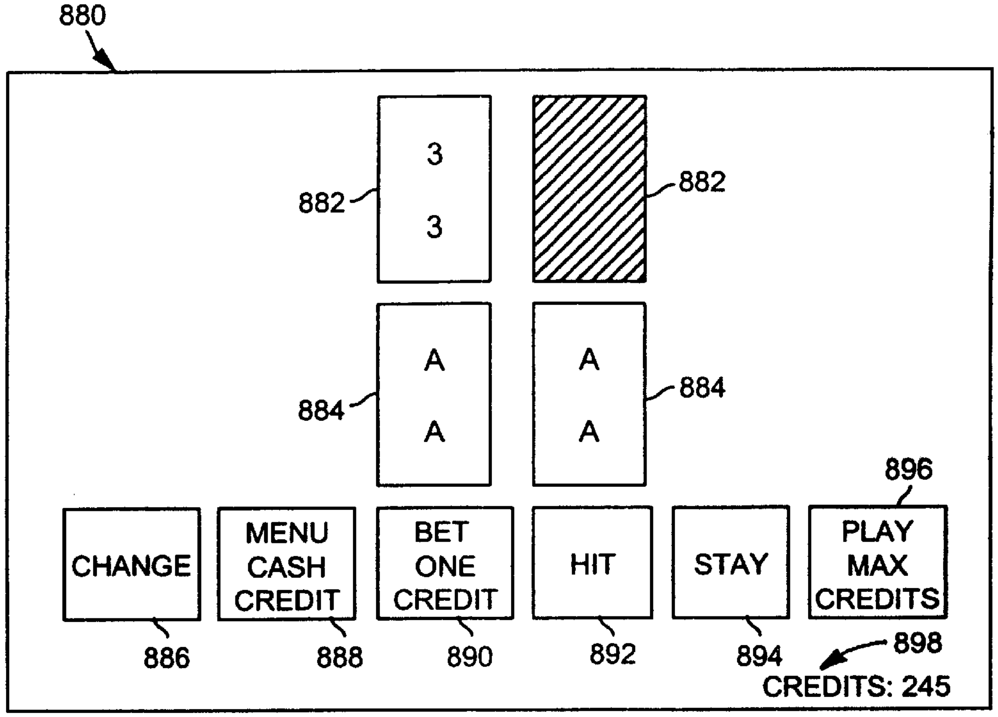
FIG. 17 is an illustration of a visual display that may be displayed when the controller of FIG. 2 performs the blackjack routine of FIG. 16.

FIG. 17 illustrates an exemplary display 880 that maybe shown on the display 222 during performance of the blackjack routine 850. Referring to FIG. 17, the display 880 may include video images representative of a plurality of cards 882 that form a dealer's blackjack hand and a plurality of cards 884 that form the player's blackjack hand. To allow the player to control the play of the blackjack game, a plurality of player-selectable button graphics may be displayed and may be operable using a touchscreen. For example, button graphics for change 886, menu, cash out and credit 888, wager one credit 890, hit 892, stay 894 and/or play max credits 896 may be provided. Further, a graphic 898 representing the number of player credits may also be displayed to inform the player of the number of credits that he or she has remaining.

Although not shown, other buttons may be provided for the player as well. For example, buttons for increasing and decreasing the wager amount maybe provided such that, when a suggested wager amount is determined and displayed by the controller 260, the player may increase or decrease the suggested wager amount to a different value if necessary.

Slots

Figure 18:
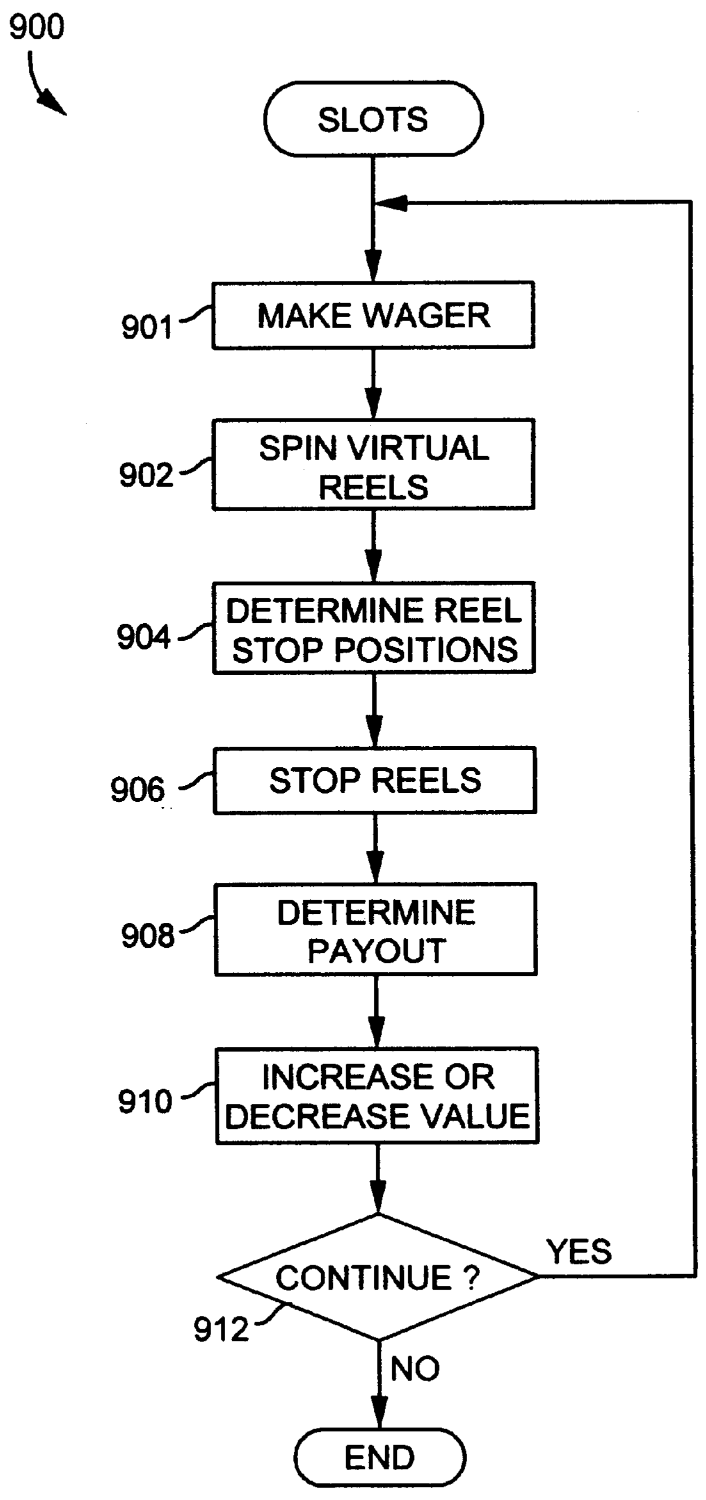
FIG. 18 is a flowchart of a slots routine that may be performed by the controller of FIG. 2.

FIG. 18 is a flowchart of a slots routine 900 which may be selected at box 315 of the controlling routine of FIG. 3. The slots routine 900 may be selected by the player, or automatically selected for the player using player tracking, as discussed above with respect to FIG. 11. Referring to FIG. 18, the slots routine 900 may begin at block 901 at which a player may make a wager. The player may accept a suggested wager provided by the controller 260 using the player tracking described above with respect to boxes 330–340 of FIG. 3, and FIGS. 4–10, or enter a wager amount for that game. After the player has made a wager, at block 902 the controller 260 may cause the stepper reels of a mechanical display, or virtual stepper reels of an electronic display 222, to spin. While the reels are spinning, at block 904 the controller 260 may determine the symbols on which the various reels are to be stopped, such as by randomly selecting one or more numbers from which the reel stop positions are determined. At block 906, the controller 260 may cause the reels of the mechanical or electronic display 222 to stop from left to right, from the perspective of the player, or in any other manner or sequence. At block 908, the controller 260 may evaluate the game outcome based on the positions at which the reels stopped and determine the payout to which the player is entitled. For example, if the reels have stopped on high payout symbols, the player may receive a large payout. If, however, the reels have stopped on symbols having no payout, the player loses the money that was wagered at the block 901. The particular payout table used to determine the payout may be selected using player tracking as discussed above with respect to FIGS. 12A–12C.

At block 910, the controller 260 may increase or decrease the player's value based on the results of the slots game as determined at the block 908. At block 912, the controller 260 may cause a message to be displayed on the display 222 asking whether the player desires to continue playing the slots game. Box 912 corresponds to box 342 of FIG. 3, where the selected game is Slots. If the player wishes to continue playing slots, the routine may branch back to block 901. If not, the video slots routine 324 may end and the controller 260 may cause block 344 of FIG. 3 to be performed.

Figure 19:
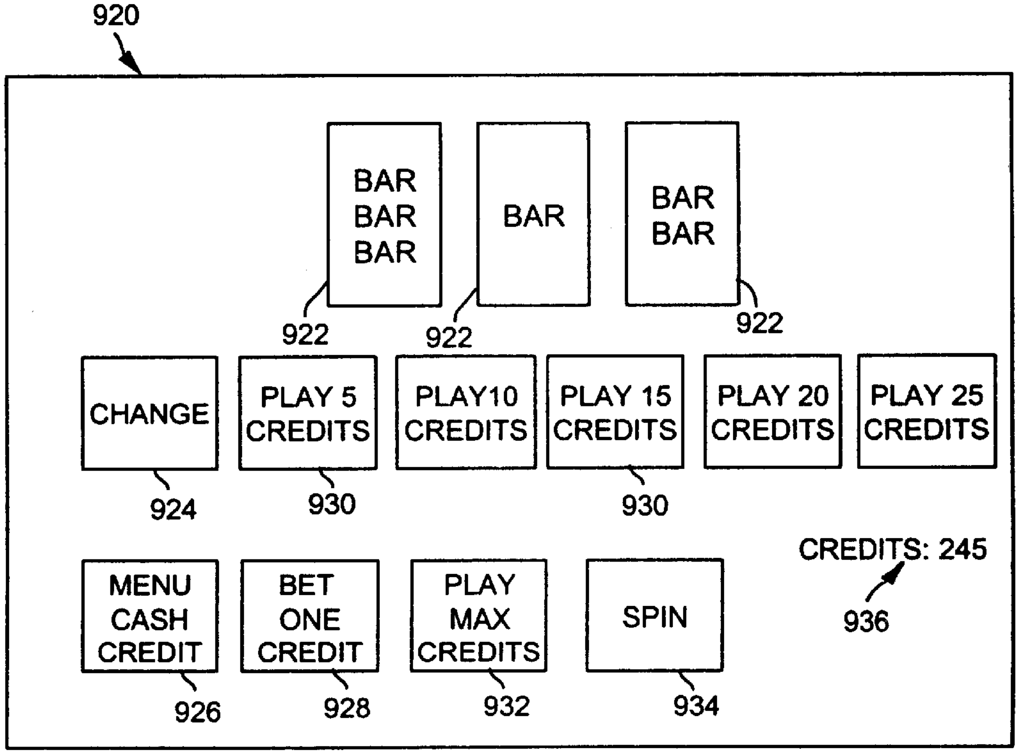
FIG. 19 is an illustration of a visual display that may be displayed when the controller of FIG. 2 performs the slots routine of FIG. 18.

FIG. 19 illustrates an exemplary display 920 that may be shown by the display 222 during performance of the slots routine 324. Referring to FIG. 19, the display 920 may include a plurality of slot machine reels 922 of a mechanical display, or alternatively, on an electronic display such as display 222 where the reels are provided as virtual images. While three such slot machine reels 922 are shown in FIG. 19, it should be understood that any number of reels could be used. To allow the player to control the play of the slot machine, a plurality of player-selectable button graphics may be displayed by the electronic display. For example, button graphics for change 924, menu, cash out and credit 926, wager one credit 928, wager various numbers of credits 930, play max credits 932, and/or spin reels 934 may be displayed, and may be operable via a touchscreen. Further, a graphic 936 representing the number of player credits may also be displayed to inform the player of the number of credits that he or she has remaining.

Although not shown, other buttons may be provided for the player as well. For example, buttons for increasing and decreasing the wager amount may be provided such that, when a suggested wager amount is determined and displayed by the controller 260, the player may increase or decrease the suggested wager amount to a different value if necessary. The display 222 may also show graphical images such as wager lines, meter information, and may also be used to display a bonus round or game.

Keno

Figure 20:
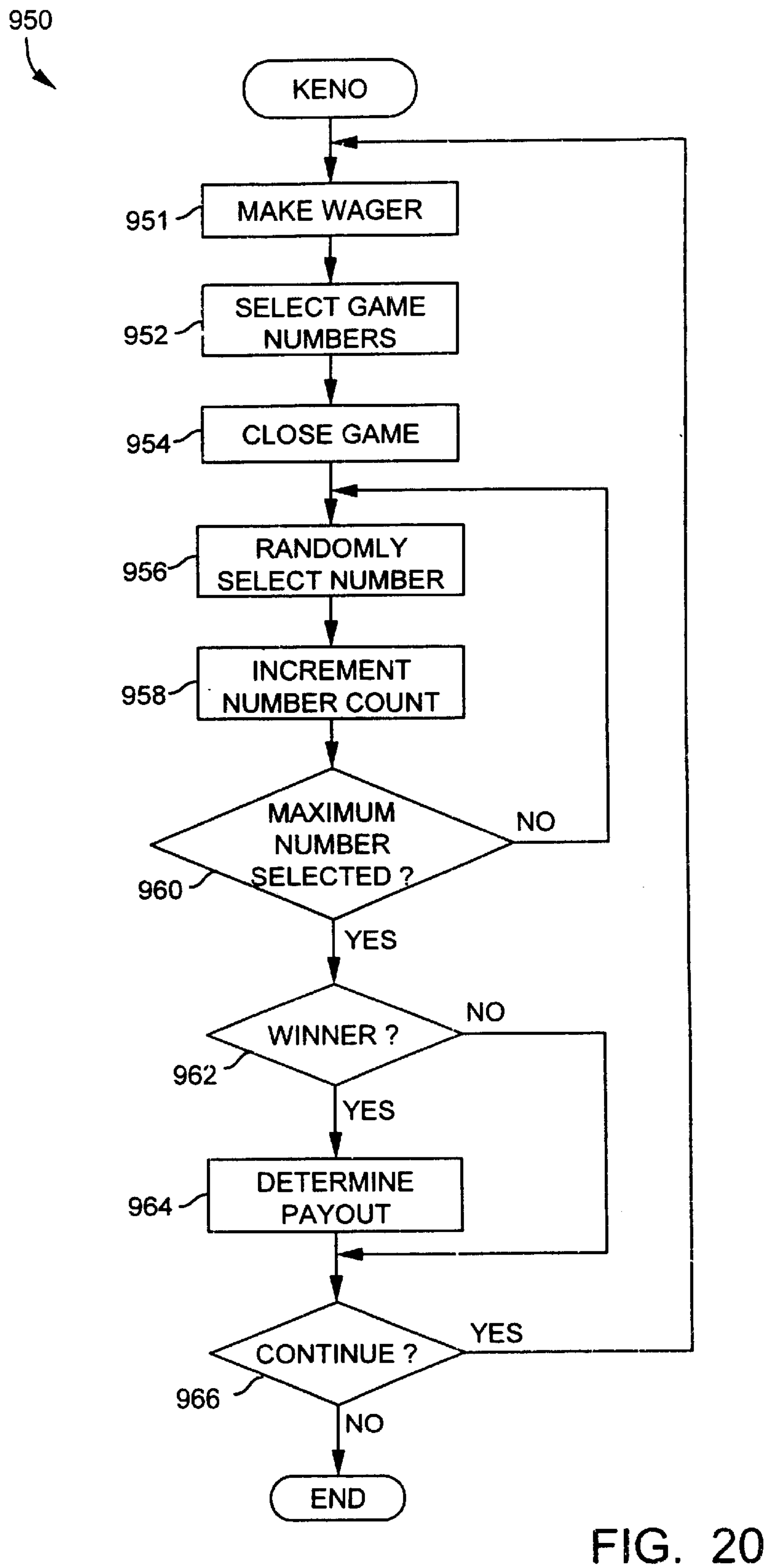
FIG. 20 is a flowchart of a keno routine that may be performed by the controller of FIG. 2.

FIG. 20 is a flowchart of a keno routine 950 which may be selected at box 315 of the controlling routine of FIG. 3. The keno routine 950 may be selected by the player, or automatically selected for the player using player tracking, as discussed above with respect to FIG. 11. The keno routine 950 may be utilized in connection with a single gaming apparatus 42 where a single player is playing a keno game, or the keno routine 950 may be utilized in connection with multiple gaming apparatuses 42 where multiple players are playing a single keno game. In the latter case, one or more of the acts described below may be performed either by the controller 260 in each gaming apparatus or by a central computer (not shown) to which multiple gaming apparatuses 42 are operatively connected, such as by a network or other data link, for example.

Referring to FIG. 20, the keno routine 950 may begin at block 951 at which time a player makes a wager on the outcome of the keno game. The player may accept a suggested wager provided by the controller 260 using the player tracking described above with respect to boxes 330–340 of FIG. 3, and FIGS. 4–10, or enter a wager amount for that game. After the player has made a wager, at block 952 the player may select one or more game numbers, which may be within a range set by the casino. After being selected, the player's game numbers may be stored in the memory of the controller 260.

At block 954, after a certain amount of time, the keno game may be closed to additional players (where a number of players are playing a single keno game using multiple gaming apparatuses 42) and/or additional game numbers for a single player. At block 956, a game number within a range set by the casino may be randomly selected either by the controller 260 or a central computer operatively connected to the controller. The randomly selected game number may be displayed on the display 222 and the displays of other gaming apparatuses 42 (if any) which are involved in the same keno game. At block 958, the controller 260 (or the central computer noted above) may increment a count which keeps track of how many game numbers have been selected at block 956.

At block 960, the controller 260 (or the central computer noted above) may determine whether a maximum number of game numbers within the range have been randomly selected. If not, another game number may be randomly selected at block 956. If the maximum number of game numbers has been selected, at block 962 the controller 260 (or a central computer) may determine whether there are a sufficient number of matches between the game numbers selected by the player and the game numbers randomly selected at block 956 to cause the player to win. The number of matches may depend on how many numbers the player selected and the particular keno rules being used.

If there are a sufficient number of matches, a payout may be determined at block 964 to compensate the player for winning the game. The payout may depend on the number of matches between the game numbers selected by the player and the game numbers randomly selected at block 956. The payout table for the payout may be determined using player tracking as discussed above with respect to FIGS. 12A–12C. At block 966, the controller 260 may cause a message to be displayed on the display 222 asking whether the player desires to play another keno game. Box 966 corresponds to Box 342 of FIG. 3, where the selected game is keno. If the player wishes to play another game of keno, the routine may branch back to block 951. If not, the keno routine 950 may end and the controller 260 may cause block 344 of FIG. 3 to be performed.

Figure 21:
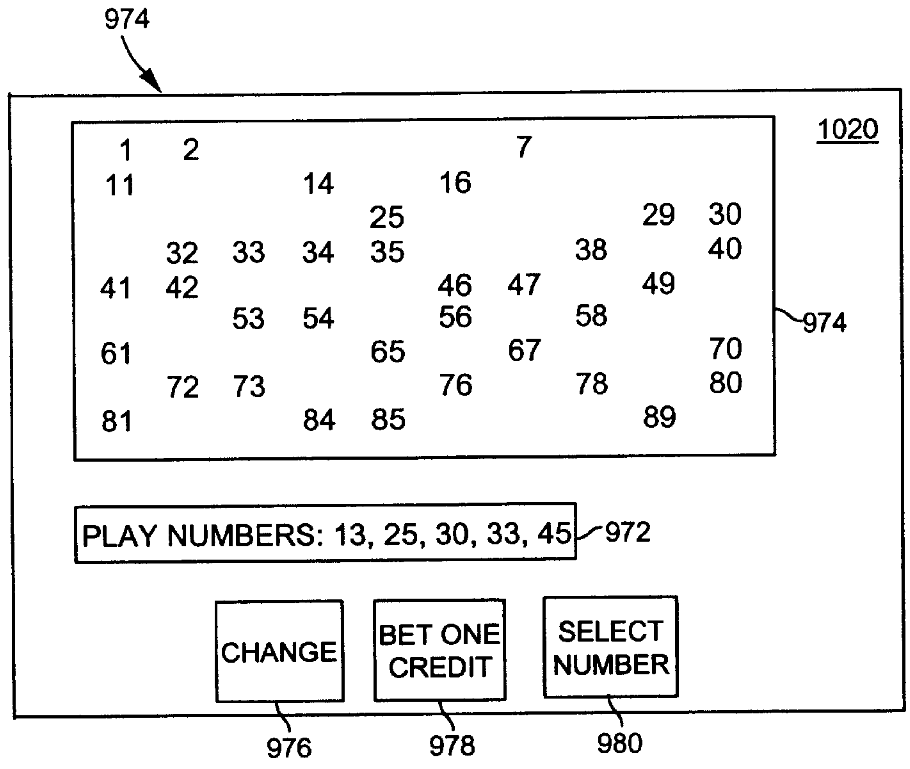
FIG. 21 is an illustration of a visual display that may be displayed when the controller of FIG. 2 performs the keno routine of FIG. 20.

FIG. 21 illustrates an exemplary display 970 that may be shown on the display 222 during performance of the video keno routine 950. Referring to FIG. 21, the display 970 may include a video image 972 of a plurality of numbers that were selected by the player and a video image 974 of the randomly selected numbers during the keno game. The randomly selected numbers may be displayed in a grid pattern. To allow the player to control the play of the keno game, a plurality of player-selectable button graphics may be displayed, such as a change graphic 976, a wager-one-credit graphic 978, and a select number graphic 980.

Although not shown, other buttons and graphics may be provided for the player as well. For example, buttons for increasing and decreasing the wager amount may be provided such that, when a suggested wager amount is determined and displayed by the controller 260, the player may increase or decrease the suggested wager amount to a different value if necessary. Further, a graphic representing the number of player credits may also be displayed to inform the player of the number of credits that he or she has remaining.

Bingo

Figure 22:
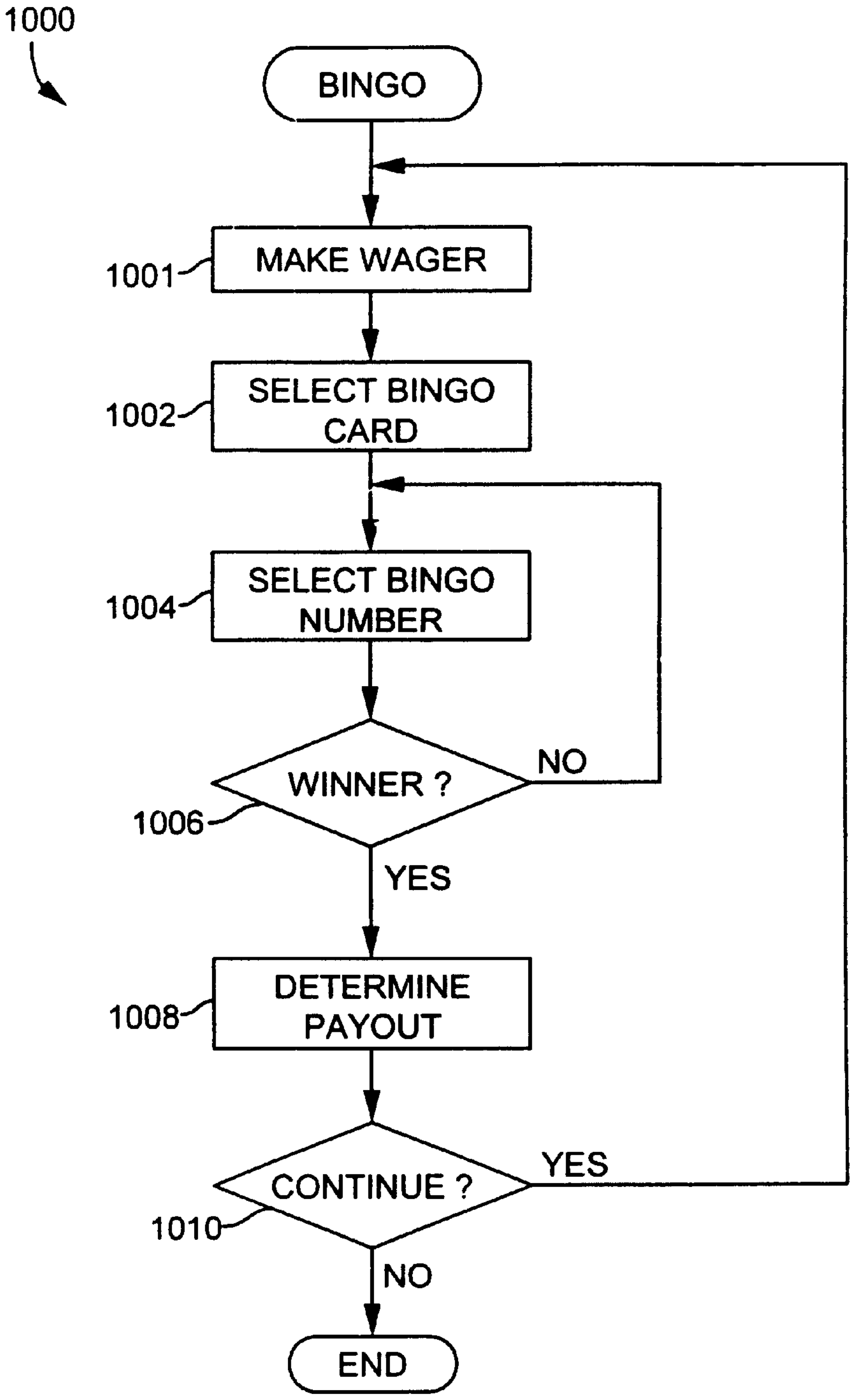
FIG. 22 is a flowchart of a bingo routine that may be performed by the controller of FIG. 2.

FIG. 22 is a flowchart of a bingo routine 1000 which may be selected at box 315 of the controlling routine of FIG. 3. The bingo routine 1000 may be selected by the player, or automatically selected for the player using player tracking, as discussed above with respect to FIG. 11. The bingo routine 1000 may be utilized in connection with a single gaming apparatus 42 where a single player is playing a bingo game, or the bingo routine 1000 may be utilized in connection with multiple gaming apparatuses 42 where multiple players are playing a single bingo game. In the latter case, one or more of the acts described below may be performed either by the controller 260 in each gaming apparatus 42 or by a central computer (not shown) to which multiple gaming apparatuses 42 are operatively connected, such as by a network or other data link, for example.

Referring to FIG. 22, at block 1001 the controller 260 may prompt a player to make a wager on the outcome of the bingo game by causing a message to be displayed on the display 222. The player may accept a suggested wager provided by the controller 260 using the player tracking described above with respect to boxes 330–340 of FIG. 3, and FIGS. 4–10, or enter a wager amount for that game. At block 1002, the player may select a bingo card, which may be generated randomly. The player may select more than one bingo card, and there may be a maximum number of bingo cards that a player may select. At block 1004, a bingo number maybe randomly generated by the controller 260 or a central computer. The bingo number may be communicated to the display 222 and to the displays of any other gaming apparatuses 42 involved in the bingo game.

At block 1006, the controller 260 (or a central computer) may determine whether the player has won according to any set of bingo rules. If no player has won, another bingo number may be randomly selected at block 1004. At block 1006, if a player has bingo (which may be determined by the controller 260), at block 1008 a payout for the winning player may be determined. The payout may depend on the number of random numbers that were drawn before there was a winner, the total number of winners (if there was more than one player), and the amount of money that was wagered on the game. The payout table for the payout may be determined using player tracking as discussed above with respect to FIGS. 12A–12C.

At block 1010, a message may be displayed on the display 222 giving the player the choice of continuing to play the game. Box 1010 corresponds to Box 342 of FIG. 3, where the selected game is bingo. Where the player wishes to continue play, the routine may return to box 1001. Where the player does not wish to continue to play bingo, the routine may return to box 346 of FIG. 3 discussed above.

Figure 23:
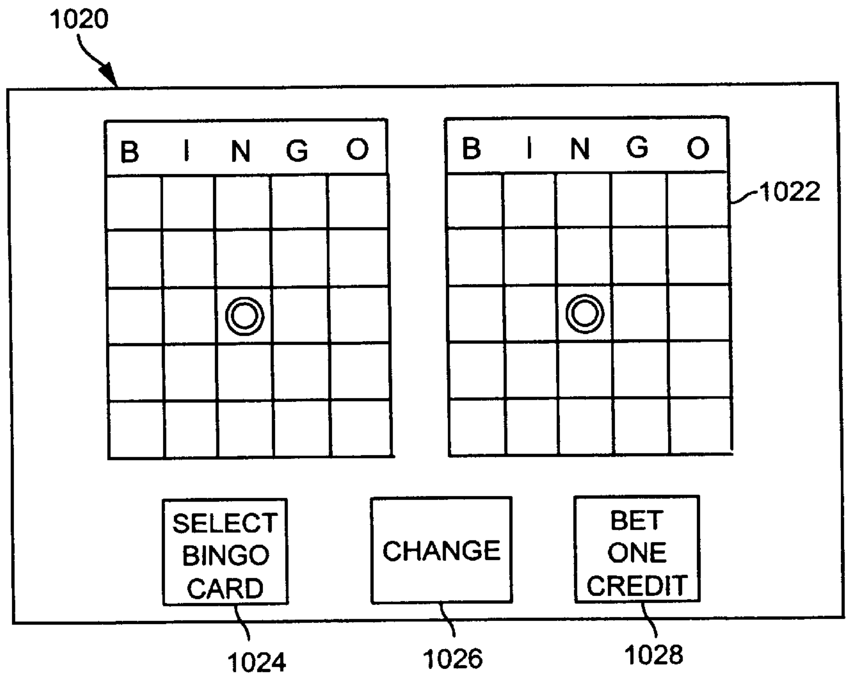
FIG. 23 is an illustration of a visual display that may be displayed when the controller of FIG. 2 performs the bingo routine of FIG. 22.

FIG. 23 illustrates an exemplary display 1020 that may be shown on the display 222 during performance of the video bingo routine 1000. Referring to FIG. 23, the display 1020 may include a video image 1022 of one or more bingo cards and images of the bingo numbers selected during the game. The bingo cards may have a grid pattern. To allow the player to control the play of the video bingo game, a plurality of user-selectable button graphics may be displayed, such as a select bingo card graphic 1024, a change graphic 1026, and/or a wager one credit graphic 1028.

Although not shown, other buttons and graphics may be provided for the player as well. For example, buttons for increasing and decreasing the wager amount may be provided such that, when a suggested wager amount is determined and displayed by the controller 260, the player may increase or decrease the suggested wager amount to a different value if necessary. Further, a graphic representing the number of player credits may also be displayed to inform the player of the number of credits that he or she has remaining.

In accordance with another embodiment, boxes 315 and 340 of the controlling routine 300 may include likelihood factor threshold functionality. In this embodiment, where the highest likelihood factor returned from the specific evaluation routines does not exceed a predetermined threshold, no game selection is automatically provided at box 315, and no suggested wager amount is provided at box 330, as confidence in the automatic game selection or suggested wager amount is too low. Such a likelihood factor threshold for providing a suggested wager value may be, for example, 51%, and a likelihood factor threshold for game selection may be, for example, 90%.

Several evaluation routines have been discussed above for implementing player tracking in a determination of a suggested wager amount, pay table and game selection. Other embodiments of the invention may utilize less than all of the evaluation routines in providing player tracking. For example, the suggested wager amount may be determined by the controller 260 based on only one, or alternatively less than all of the specific evaluation routines discussed with respect to FIGS. 5–10.

Further, some of the specific evaluation routines may not be utilized by the controller in every gaming session. For example, where the player has initiated a gaming session without using a player tracking card or player identification, the automatic game selection which may be provided in conjunction with box 315 is not performed. Similarly, where the player tracking card or player identification are not used, player tracking such as providing suggested wager amounts may not be implemented until the player has played a predetermined number of game iterations, in order to provide sufficient data for the player tracking routines to provide reliable suggested wager amounts. Alternatively, the player tracking may always be implemented in providing the suggested wager amounts where the threshold functionality is provided as discussed above. In this circumstance, the player tracking may not be apparent to the player (e.g., no suggested wager amounts provided) until after a number of game iterations, after which time sufficient information is collected by the evaluation routines to provide somewhat reliable percentages of certainty for suggested wager amounts. Additionally, numerical values have been used in describing the player tracking routines discussed above for various limitations and thresholds, for example, preset percentage of certainties, wager factors, streak sizes, minimum win thresholds, etc. However, one skilled in the art will realize that the numerical values provided are by way of example only and other values may be used while still achieving advantages discussed herein.

Further, not every evaluation routine will be used by the controller in providing a suggested wager amount for every game. For example, the specific evaluation routine discussed above based on a player's first wager for a particular gaming session may be utilized bathe controller 260 in providing a suggested wager amount for only the player's first wager for a particular gaming session.

Thus, player tracking may be utilized within the gaming apparatus 42 to reduce repetitive motions required by players. For example, player tracking may allow game selection for a player, suggested wager amounts to be provided for a player, and in determining a pay table for use in payouts for the player.

The player tracking discussed herein is exemplary in nature, and one skilled in the art would realize that player tracking may be implemented in other forms on the gaming apparatus 42 by monitoring other potential game parameters over a plurality of player actions. For example, player tracking may be used to track the number of lines bet in a multi-line slot game, or the number of keno spots the player chooses. Further, the player tracking maybe implemented in conjunction with other games not discussed above which may be provided on the gaming apparatus 42.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

We claim:

1. A gaming apparatus allowing a player to play a game comprising:

a display apparatus that is capable of generating video images;

a value-input device that is capable of allowing the player to deposit a medium of value;

an input device that allows the player to make an input; and a controller operatively coupled to the display apparatus, the value-input device and the input device, the controller comprising a processor and a memory operatively coupled to the processor, the controller being programmed to allow the player to make a wager, the controller being programmed to cause a sequence of video images to be generated on the display apparatus after the value-input device detects deposit of value by the player, the sequence of video images representing a game, the controller being programmed to monitor a plurality of different wagers made by the player during use of the gaming apparatus, the controller being programmed to determine a likely wager value for the player using the monitored wagers, and the controller being programmed to display the likely wager value on the display apparatus.

2. The gaming apparatus as defined in claim 1 further comprising the controller being programmed to determine a likelihood factor that the likely wager value is a desired wager value for the player, wherein the controller selects the likely wager value and displays the likely wager value responsive to the determined likelihood factor.

3. The gaming apparatus as defined in claim 1 wherein the controller is programmed to monitor a set of wagers, the controller is programmed to monitor a plurality of sets of wagers for different game circumstances, the controller is programmed to select a potential likely wager value for the player for each game circumstance, and the controller is programmed to select the likely wager value and display the likely wager value on the display apparatus using the selected potential likely wager values.

4. The gaming apparatus as defined in claim 1 wherein the controller is programmed to determine a likely wager value by calculating an average wager value made by the player, the controller is programmed to determine a likelihood factor that the average wager value is a desired wager value for the player, the controller is programmed to select the average wager value as a current wager value for the player and display the average wager value on the display apparatus responsive to the determined likelihood factor.

5. The gaming apparatus as defined in claim 1 wherein the controller is programmed to determine a likely wager value by determining a number of consecutive wagers of a particular wager value, the controller is programmed to determine a likelihood factor that the particular wager value is a desired wager value for the player, and the controller is programmed to select the particular wager value as a current wager for the player, and display the particular wager value on the display apparatus responsive to the determined likelihood factor.

6. The gaming apparatus as defined in claim 1 wherein the controller is programmed to determine a likely wager value by determining a number of consecutive first wagers of a particular wager value for the player over prior game sessions, the controller is programmed to determine a likelihood factor that the particular wager is a desired wager value for the player at the beginning of a current game session, and the controller is programmed to select the particular wager amount as a current wager value at the beginning of the current game session for the player, and display the particular wager value on the display apparatus responsive to the determined likelihood factor.

7. The gaming apparatus as defined in claim 1 wherein the controller is programmed to determine a likely wager value by calculating a streak wager value for the player using wager values made by the player during prior streaks, the controller is programmed to determine a likelihood factor that the streak wager value is a desired wager value for the player during a current streak, and the controller is programmed to select the streak wager value as a current wager amount for the player during the current streak, and display the streak wager value on the display apparatus responsive to the determined likelihood factor.

8. The gaming apparatus as defined in claim 7 wherein the streak is a winning streak.

9. The gaming apparatus as defined in claim 7 wherein the streak is a losing streak.

10. The gaming apparatus as defined in claim 1 wherein the controller is programmed to determine a likely wager value by calculating a big win wager value using wager values made by the player after prior large payouts, the controller is programmed to determine a likelihood factor that the big win wager value is a desired wager value for the player after a current large payout, the controller is programmed to select the big win wager value as a current wager value for the player after the current large payout, and display the big win wager value on the display apparatus responsive to the determined likelihood factor.

11. The gaming apparatus as defined in claim 1 wherein the controller is programmed to determine a likely wager value by calculating a particular wager value based on prior wagers made by the player with the same number of credits remaining in the gaming apparatus, the controller is programmed to determine a likelihood factor that the particular wager value is a desired current wager value for the player for the current number of credits remaining in the gaming apparatus, and the controller is programmed to select the particular wager value as a current wager value for the player for the current number of credits remaining, and display the particular wager value on the display apparatus responsive to the determined likelihood factor.

12. The gaming apparatus as defined in claim 1 wherein the controller is programmed to determine a likely wager value by calculating a particular wager value based on prior wagers made by the player when the number of credits remaining in the gaming apparatus is less than a previous wager value, the controller is programmed to determine a likelihood factor that the particular wager value is a desired current wager value for the player when the number of credits remaining in the gaming apparatus is less than the previous wager value, and the controller is programmed to select the particular wager value as a current wager value for the player when the number of credits in the gaming apparatus is less than the previous wager value, and display the particular wager value on the display apparatus responsive to the determined likelihood factor.

13. A gaming apparatus allowing a player to play a game selected from the group of casino games consisting of video poker, video slots, video blackjack, video keno and video bingo, the gaming apparatus comprising:

a display apparatus that is capable of generating video images;

a value-input device that is capable of allowing the player to deposit a medium of value;

an input device that allows the player to make an input; and a controller operatively coupled to the display apparatus, the value-input device and the input device, the controller comprising a processor and a memory operatively coupled to the processor, the controller being programmed to allow the player to make a wager, the controller being programmed to cause a sequence of video images to be generated on the display apparatus after the value-input device detects deposit of value by the player, the sequence of video images representing a game selected from the group of games consisting of video poker, video slots, video blackjack, video keno and video bingo, at least one of the images comprising an image of at least five playing cards if the game is video poker, at least one of the images comprising an image of a plurality of simulated slot machine reels if the game is video slots, at least one of the images comprising an image of a plurality of playing cards if the game is video blackjack, at least one of the images comprising an image of a keno numbers if the game is video keno, and at least one of the images comprising an image of a bingo grid if the game is video bingo, the controller being programmed to monitor actions by a player during use of the gaming apparatus, the controller being programmed to determine a potential game parameter based on the monitored actions, the controller being programmed to operate the gaming apparatus and to display images on the display apparatus responsive to the determined potential game parameter, the controller being programmed to monitor the player's previous game selections and determine the likely current game selection for the player as the potential game parameter, and the controller being programmed to display video images corresponding to the likely current game selection for the player on the display apparatus.

14. A gaming apparatus allowing a player to play a game selected from the group of casino games consisting of video poker, video slots, video blackjack, video keno and video bingo, the gaming apparatus comprising:

a display apparatus that is capable of generating video images;

a value-input device that is capable of allowing the player to deposit a medium of value;

an input device that allows the player to make an input; and a controller operatively coupled to the display apparatus, the value-input device and the input device, the controller comprising a processor and a memory operatively coupled to the processor, the controller being programmed to allow the player to make a wager, the controller being programmed to cause a sequence of video images to be generated on the display apparatus after the value-input device detects deposit of value by the player, the sequence of video images representing a game selected from the group of games consisting of video poker, video slots, video blackjack, video keno and video bingo, at least one of the images comprising an image of at least five playing cards if the game is video poker, at least one of the images comprising an image of a plurality of simulated slot machine reels if the game is video slots, at least one of the images comprising an image of a plurality of playing cards if the game is video blackjack, at least one of the images comprising an image of a keno numbers if the game is video keno, and at least one of the images comprising an image of a bingo grid if the game is video bingo, the controller being programmed to monitor actions by a player during use of the gaming apparatus, the controller being programmed to determine a potential game parameter based on the monitored actions, the controller being programmed to operate the gaming apparatus and to display images on the display apparatus responsive to the determined potential game parameter, and the controller being programmed to determine a likelihood factor that the potential game parameter is a desired action for the player and wherein the controller is programmed to operate the gaming apparatus and to display information on the display apparatus responsive to the determined likelihood factor.

15. The gaming apparatus as defined in claim 14 wherein the controller is programmed to generate an explanation message and to display the explanation message on the display apparatus, the explanation message providing an explanation to the player for the operation of the gaming apparatus and the displaying of information on the display apparatus responsive to the potential game parameter.

16. The gaming apparatus as defined in claim 14 wherein the determined potential game parameter represents a likely action for the player based on the plurality of monitored player actions.

17. The gaming apparatus as defined in claim 14 wherein the controller is programmed to provide threshold likelihood factor functionality and to operate the gaming apparatus and to display information on the display apparatus responsive to the determined likelihood factor exceeding a predetermined threshold.

18. The gaming apparatus as defined in claim 14 wherein the controller is programmed to monitor the player's privilege level actions and determine the player privilege level from the monitored privilege level actions as the potential game parameter, and the controller is programmed to display the pay table for the player corresponding to the player privilege level on the display apparatus.

19. The gaming apparatus as defined in claim 14 wherein the controller is programmed to monitor a plurality of sets of player actions, the controller is programmed to determine a plurality of potential game parameters, each of the potential game parameters based on one of the sets of monitored actions, and the controller is programmed to operate the gaming apparatus and display information on the display apparatus responsive to the plurality of determined potential game parameters.

20. The gaming apparatus as defined in claim 19 wherein the controller is programmed to determine a plurality of likelihood factors, each likelihood factor corresponding to one of the plurality of potential game parameters and representing a likelihood that the corresponding potential game parameter is a desired action for the player, the controller is programmed to select the potential game parameter having the highest likelihood factor, and the controller is programmed to operate the gaming apparatus and to display information on the display apparatus responsive to the selected potential game parameter.

21. The gaming apparatus as defined in claim 20 wherein the controller is programmed to resolve conflicts between selected potential game parameters having an equal likelihood factor of being the desired action for the player.

22. The gaming apparatus as defined in claim 21 wherein the controller is programmed to resolve conflicts based on a priority corresponding to each potential game parameter, wherein the potential game parameter having both the highest likelihood factor and the highest priority is selected by the controller when there are more than one potential game parameter having the highest likelihood factor.

23. A gaming apparatus allowing a player to play a game comprising:

a display apparatus that is capable of generating video images;

a value-input device that is capable of allowing the player to deposit a medium of value; and a controller operatively coupled to the display apparatus and the value-input device, the controller comprising a processor and a memory operatively coupled to the processor, the controller being programmed to allow the player to make a wager, the controller being programmed to cause a sequence of video images to be generated on the display apparatus after the value-input device detects deposit of value by the player, the sequence of video images representing the game, the controller being programmed to monitor actions by a player during use of the gaming apparatus, the controller being programmed to determine a potential game parameter based on the monitored actions, the controller being programmed to operate the gaming apparatus and to display images on the display apparatus responsive to the determined potential game parameter, the controller is programmed to monitor the player's previous game selections and determine the likely current game selection for the player as the potential game parameter, and the controller is programmed to display video images corresponding to the likely current game selection for the player on the display apparatus.

24. A gaming apparatus allowing a player to play a game comprising:

a display apparatus that is capable of generating video images;

a value-input device that is capable of allowing the player to deposit a medium of value; and a controller operatively coupled to the display apparatus and the value-input device, the controller comprising a processor and a memory operatively coupled to the processor, the controller being programmed to allow the player to make a wager, the controller being programmed to cause a sequence of video images to be generated on the display apparatus after the value-input device detects deposit of value by the player, the sequence of video images representing the game, the controller being programmed to monitor actions by a player during use of the gaming apparatus, the controller being programmed to determine a potential game parameter based on the monitored actions, the controller being programmed to operate the gaming apparatus and to display images on the display apparatus responsive to the determined potential game parameter, and the controller is programmed to determine a likelihood factor that the potential game parameter is a desired action for the player, and wherein the controller is programmed to operate the gaming apparatus and to display information on the display apparatus responsive to the determined likelihood factor.

25. The gaming apparatus as defined in claim 24 wherein the controller is programmed to generate an explanation message and to display the explanation message on the display apparatus, the explanation message providing an explanation to the player for the operation of the gaming apparatus and the displaying of information on the display apparatus responsive to the potential game parameter.

26. The gaming apparatus as defined in claim 24 wherein the determined potential game parameter represents a likely action for the player based on the plurality of monitored player actions.

27. The gaming apparatus as defined in claim 24 wherein the controller is programmed to provide threshold likelihood factor functionality, and wherein the controller is programmed to operate the gaming apparatus and to display information on the display apparatus responsive to the determined likelihood factor exceeding a predetermined threshold.

28. The gaming apparatus as defined in claim 24 wherein the controller is programmed to monitor the player's privilege level actions and determine the player privilege level from the monitored privilege level actions as the potential game parameter, and the controller is programmed to display the pay table for the player corresponding to the player privilege level on the display apparatus.

29. The gaming apparatus as defined in claim 24 wherein the controller is programmed to monitor player actions comprises monitoring a set of player actions, the controller is programmed to monitor a plurality of sets of player actions, the controller is programmed to determine a plurality of potential game parameters, each of the potential game parameters based on one of the sets of monitored actions, and the controller is programmed to operate the gaming apparatus and display information on the display apparatus responsive to the plurality of determined potential game parameters.

30. The gaming apparatus as defined in claim 29 wherein the controller is programmed to determine a plurality of likelihood factors, each likelihood factor corresponding to one of the plurality of potential game parameters and representing a likelihood that the corresponding potential game parameter is a desired action for the player, the controller is programmed to select the potential game parameter having the highest likelihood factor, and the controller is programmed to operate the gaming apparatus and to display information on the display apparatus responsive to the selected potential game parameter.

31. The gaming apparatus as defined in claim 30 wherein the controller is programmed to resolve conflicts between selected potential game parameters having an equal likelihood factor of being the desired action for the player.

32. The gaming apparatus as defined in claim 31 wherein the controller is programmed to resolve conflicts based on a priority corresponding to each potential game parameter, wherein the potential game parameter having both the highest likelihood factor and the highest priority is selected by the controller when there are more than one potential game parameter having the highest likelihood factor.

33. A gaming apparatus allowing a player to play slots, comprising:

a plurality of slot reels, each of the slot reels comprising a plurality of slot symbols, the slot reels being provided either as rotatable mechanical reels or video images simulating slot reels;

a display apparatus that is capable of generating video images;

a value-input device that is capable of allowing the player to deposit a medium of value;

an input device that allows the player to make an input for playing the slots game; and a controller operatively coupled to the display apparatus, the value-input device and the input device, the controller comprising a processor and a memory operatively coupled to the processor, the controller being programmed to allow the player to make a wager in the slots game, the controller being programmed to cause the slot reels to be spun after the value-input device detects deposit of value by the player, the controller being programmed to monitor actions by a player during use of the slots game, the controller being programmed to determine a potential game parameter based on the monitored actions, the controller being programmed to operate the slots game and to display images on the display apparatus responsive to the determined potential game parameter, the controller being programmed to determine a likelihood factor that the potential game parameter is a desired action for the player, and the controller being programmed to operate the gaming apparatus and to display information on the display apparatus responsive to the determined likelihood factor.

34. The gaming apparatus as defined in claim 33 wherein the controller is programmed to monitor the player's previous wagers and determine the likely current wager value for the player as the potential game parameter, and the controller is programmed to display the likely current wager value on the display apparatus.

35. The gaming apparatus as defined in claim 33 wherein the determined potential game parameter represents a likely action for the player based on the plurality of monitored player actions.

36. The gaming apparatus as defined in claim 33 wherein the controller is programmed to determine a likelihood factor that the potential game parameter is a desired action for the player, and wherein the controller is programmed to operate the gaming apparatus and to display information on the display apparatus responsive to the determined likelihood factor.

37. The gaming apparatus as defined in claim 33 wherein the controller is programmed to monitor the player's privilege level actions, and determine the player privilege level from the monitored privilege level actions as the potential game parameter, and the controller is programmed to display the pay table for the player corresponding to the player privilege level on the display apparatus.

38. The gaming apparatus as defined in claim 33 wherein the controller is programmed to monitor player actions comprises monitoring a set of player actions, the controller is programmed to monitor a plurality of sets of player actions, the controller is programmed to determine a plurality of potential game parameters, each of the potential game parameters based on one of the sets of monitored actions, and the controller is programmed to operate the gaming apparatus and display information on the display apparatus responsive to the plurality of determined potential game parameters.

39. A gaming method comprising:

causing a video game image to be generated, the video game image representing a game executable on a gaming apparatus, the video game image being generated on a display apparatus associated with the gaming apparatus;

determining an outcome of the game represented by the video game image;

determining a value payout associated with the outcome of the game;

monitoring actions by a player during use of the gaming apparatus, the monitoring comprising monitoring the player's previous game selections;

determining a potential game parameter based on the monitored actions, the determining comprising determining the likely current game selection for the player; and operating the gaming apparatus and displaying images on the display apparatus responsive to the determined potential game parameter, the displayihg comprising displaying video images corresponding to the likely current game selection for the player on the display apparatus.

40. A gaming method comprising:

causing a video game image to be generated, the video game image representing a game executable on a gaming apparatus, the video game image being generated on a display apparatus associated with the gaming apparatus;

determining a value payout associated with an outcome of the game;

monitoring actions by a player during use of the gaming apparatus;

determining a potential game parameter based on the monitored actions;

operating the gaming apparatus and displaying images on the display apparatus responsive to the determined potential game parameter; and determining a likelihood factor that the potential game parameter is a desired action for the player, wherein the operating the gaming apparatus and displaying of information on the display apparatus is responsive to the determined likelihood factor.

41. A gaming method as defined in claim 40, additionally comprising generating an explanation message and displaying the explanation message on the display apparatus, the explanation message providing an explanation to the player for the operation of the gaming apparatus and the displaying of information on the display apparatus responsive to the potential game parameter.

42. A gaming method as defined in claim 40, wherein the determined potential game parameter represents a likely action for the player based on the plurality of monitored player actions.

43. A gaming method as defined in claim 40, comprising:

monitoring the player's privilege level actions;

determining the player privilege level from the monitored privilege level actions; and displaying the pay table for the player corresponding to the player privilege level on the display apparatus.

44. A gaming method as defined in claim 40, comprising:

monitoring a set of player actions;

determining a plurality of potential game parameters, each of the potential game parameters based on one of the sets of monitored actions; and operating the gaming apparatus and displaying information on the display apparatus responsive to the plurality of determined potential game parameters.

45. A gaming method as defined in claim 44, comprising:

determining a plurality of likelihood factors, each likelihood factor corresponding to one of the plurality of potential game parameters and representing a likelihood that the corresponding potential game parameter is a desired action for the player; and selecting the potential game parameter having the highest likelihood factor;

operating the gaming apparatus and displaying information on the display apparatus responsive to the selected potential game parameter.

* * * * *